United States Patent
Polymeropoulos

(10) Patent No.: US 12,478,619 B2
(45) Date of Patent: Nov. 25, 2025

(54) METHOD OF TREATMENT WITH MILSAPERIDONE

(71) Applicant: Vanda Pharmaceuticals Inc., Washington, DC (US)

(72) Inventor: Mihael H. Polymeropoulos, Potomac, MD (US)

(73) Assignee: Vanda Pharmaceuticals Inc., Washington, DC (US)

( * ) Notice: Subject to any disclaimer, the term of this patent is extended or adjusted under 35 U.S.C. 154(b) by 0 days.

(21) Appl. No.: 18/965,591

(22) Filed: Dec. 2, 2024

(65) Prior Publication Data

US 2025/0090518 A1    Mar. 20, 2025

Related U.S. Application Data

(63) Continuation-in-part of application No. PCT/US2024/032137, filed on May 31, 2024.

(60) Provisional application No. 63/505,884, filed on Jun. 2, 2023.

(51) Int. Cl.
*A61K 31/454*    (2006.01)
*G01N 33/62*    (2006.01)

(52) U.S. Cl.
CPC .......... *A61K 31/454* (2013.01); *G01N 33/62* (2013.01); *G01N 2800/52* (2013.01)

(58) Field of Classification Search
CPC ................ A61K 31/451; A61K 31/454; A61K 31/5415; A61K 45/06; A61P 25/18
See application file for complete search history.

(56) References Cited

U.S. PATENT DOCUMENTS

| | | |
|---|---|---|
| RE39,198 E | 7/2006 | Strupczewski et al. |
| 7,977,356 B2 | 7/2011 | Grimler et al. |
| 8,314,129 B2 | 11/2012 | Grimler et al. |
| 8,586,610 B2 | 11/2013 | Wolfgang et al. |
| 8,652,776 B2 | 2/2014 | Lavedan et al. |
| 8,999,638 B2 | 4/2015 | Wolfgang et al. |
| 9,072,742 B2 | 7/2015 | Lavedan et al. |
| 9,074,254 B2 | 7/2015 | Lavedan et al. |
| 9,074,255 B2 | 7/2015 | Lavedan et al. |
| 9,074,256 B2 | 7/2015 | Lavedan et al. |
| 9,080,214 B2 | 7/2015 | Lavedan et al. |
| 9,138,432 B2 | 9/2015 | Wolfgang et al. |
| 9,157,121 B2 | 10/2015 | Wolfgang et al. |
| 9,328,387 B2 | 5/2016 | Lavedan et al. |
| 9,458,507 B1 | 10/2016 | Lavedan et al. |
| 10,272,076 B2 | 4/2019 | Wolfgang et al. |
| 10,441,580 B2 | 10/2019 | Polymeropoulos et al. |
| 10,563,259 B2 | 2/2020 | Wolfgang et al. |
| 10,874,659 B2 * | 12/2020 | Phadke .................. A61P 25/18 |
| 10,987,346 B2 | 4/2021 | Polymeropoulos et al. |

OTHER PUBLICATIONS

Mellado et al. (Best Practice and research Clinical Rheumatology, vol. 18; 2, pp. 111-124, 2004 (Year: 2004).*

(Continued)

*Primary Examiner* — Savitha M Rao
(74) *Attorney, Agent, or Firm* — Hoffman Warnick LLC

(57) ABSTRACT

Described herein is an improved method of treatment with iloperidone or milsaperidone, of a patient in need of such treatment, comprising accounting for an increase in a serum urate level of the patient during treatment with the iloperidone or milsaperidone.

14 Claims, 12 Drawing Sheets

(56) References Cited

OTHER PUBLICATIONS

Sabrina Paganoni et al., Urate as a Marker of Risk and Progression of Neurodegenerative Disease, Neurotherapeutics 14:1, pp. 148-153 (Dec. 19, 2016).
Kelly Claire Simon, ScD et al., Mendelian Randomization of Serum Urate and Parkinson Disease Progression, Annals of Neurology 76:6, pp. 862-868 (Oct. 3, 2014).
International Search Report and Written Opinion of the International Searching Authority, International application No. PCT/US2024/032137, pp. 1-13 (Sep. 17, 2024).

* cited by examiner

METHOD OF TREATMENT WITH MILSAPERIDONE

CROSS REFERENCE TO RELATED APPLICATIONS

The present patent application is a continuation-in-part of International Patent Application No. PCT/US2024/032137, filed May 31, 2024, which claims priority to U.S. Provisional Patent Application No. 63/505,884, filed Jun. 2, 2023.

BACKGROUND OF THE INVENTION

The invention relates generally to improvements in methods of treatment with iloperidone or milsaperidone. More particularly, the invention relates to improved methods of treatment with iloperidone or milsaperidone which limit risk of hyperuricemia and gout.

Iloperidone (1-[4-[3-[4-(6-flouro-1,2-benzisoxazol-3-yl)-1-piperidinyl]propoxy]-3-methoxyphenyl]ethanone or 4'-[3-[4-(6-Fluoro-1,2-benzisoxazol-3-yl)piperidino]propoxy]-3'-methoxyacetophenone) is a compound belonging to the class of piperidinyl-benzisoxazole derivatives, and is an atypical antipsychotic disclosed in U.S. Pat. RE39198. Iloperidone is approved for use in the treatment of schizophrenia in adults, and the acute treatment of manic or mixed episodes associated with bipolar I disorder in adults. Iloperidone is also in development for use in the treatment of other psychotic symptoms, diseases, and disorders.

Milsaperidone (1-[4-[3-[4-(6-fluoro-1,2-benzisoxazol-3-yl)-1-piperidinyl]propoxy]-3-methoxyphenyl]ethanol), or 4-[3-[4-(6-fluoro-1,2-benzisoxazol-3-yl)-1-piperidinyl]propoxy]-3-methoxy-α-methylbenzenemethanol), also known as (S)-P-88-8891, S-P88, or P88, is an active metabolite of iloperidone that functions as a prodrug of iloperidone, and is disclosed in U.S. Pat. Nos. 8,314,129 and 7,977,356. In humans, P88 is only found in the S-enantiomeric form (milsaperidone), which has the following structure:

(S-P88)

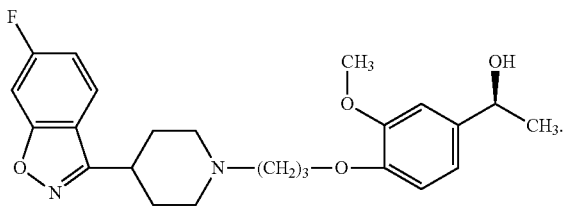

However, P88 can also be synthesized in its R enantiomeric form, which has the structure:

(R-P88)

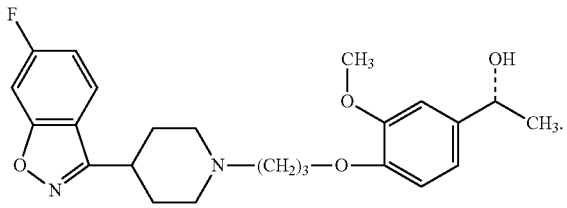

P88, and the S and R forms thereof, are described in U.S. Pat. Nos. 7,977,356, 8,314,129, and 10,874,659.

Previous studies have investigated associations between iloperidone efficacy and polymorphisms in genes and gene regions including CFTR, NPAS3, XKR4, TNR, GRIA4, GFRA2, and NUDT9P1. These associations are described in, e.g., U.S. Pat. Nos. 9,328,387, 9,458,507, and 9,080,214. Additionally, associations between CYP2D6 and KCNQ1 genotypes and changes in QT interval following the administration of iloperidone are described in U.S. Pat. Nos. 8,586,610, 9,138,432, 8,999,638, 9,157,121, and 10,563,259. Further associations between genetic variations in SLCO3A1, BAI3, CERKL, FAM13A1, and ABCC2 genes and changes in QT interval following the administration of iloperidone are described in U.S. Pat. Nos. 8,652,776, 9,072,742, 9,074,254, 9,074,255, and 9,074,256. Exemplary findings such as these, relating to the safety and efficacy of iloperidone, aid in selection of the most optimal drug and dosage regimen for a particular patient. This in turn aids in safe and effective treatment of psychotic symptoms, diseases, and disorders, with less trial and error, and a reduction in deleterious side effects.

Uric acid is the end product of purine metabolism in humans and primates, which lack the enzyme uricase to further oxidize the heterocyclic compound. Under normal conditions the urate anion is generated after breakdown of excess purine nucleosides in the liver and the majority of the molecule is then excreted through the kidneys via urine. Hyperuricemia, or elevated levels of serum urate (uric acid in the blood), is a significant risk factor for gout, a common and complex inflammatory arthritis characterized by painful recurrent attacks of swelling and tenderness of the joints. Excess urate in the body causes gout due to deposition of monosodium urate crystals (i.e. tophi) in cartilage tissues, tendons, and soft tissues. Crystal deposits can also form in the kidneys, leading to uric acid kidney stones and in chronic cases, renal failure.

The concentration of serum urate in individuals is influenced by several factors, most notably genetic polymorphisms of renal transporters, medications, and diet. Levels of serum urate correlate with blood pressure, metabolic syndrome, diabetes, gout, and cardiovascular disease. Commercial laboratory tests are routinely used to evaluate the presence of uric acid in the blood, as an imbalance in serum urate is an established marker of underlying disease states and facilitates diagnosis of, e.g., gout, renal or kidney impairment, and rare inherited conditions.

Bidirectional transport of urate and the presence of hepatic uricase in non-primate mammalian models limited early study of uric acid transport in humans. However, genetic methods have facilitated the discovery of transport proteins as well as the functional impact of genetic polymorphisms in the genes that encode them. For example, the SLC2A9 gene encodes a high-capacity hexose-urate transporter in humans and is mainly expressed in kidneys, liver, and intestines. Loss of function variants of SLC2A9 were previously identified in association with hyperuricemia, and recent genome-wide association studies have since correlated common genetic variants of SLC2A9 with increased concentrations of serum urate and gout.

BRIEF DESCRIPTION OF THE INVENTION

Various aspects of the invention disclosed herein related to improved methods for the treatment of a patient in need thereof, with iloperidone, while reducing risk of hyperuricemia and gout.

In a first aspect, an improved method is provided, consisting essentially of treating a patient with milsaperidone. The improvement in the method comprises accounting for an increase in a serum urate level of the patient during treatment with the milsaperidone.

In certain embodiments, the treatment comprises treatment with milsaperidone at a dose of 24 mg/day given as 12 mg twice daily (bid).

In certain embodiments, the treatment with milsaperidone results in the increase in the serum urate level of the patient, and the accounting has the effect of preventing, limiting a frequency of, or limiting a severity of a disease, a condition, or a symptom caused by hyperuricemia or gout.

In certain embodiments, the accounting comprises monitoring the serum urate level of the patient. In certain embodiments, the monitoring comprises obtaining or having obtained a biological sample from the patient; and testing or having tested the biological sample to determine a concentration of urate in the biological sample; and performing the monitoring at one or more milestones selected from: on or about day 28 of treatment, on or about day 21 of treatment, on or about day 14 of treatment, on or about day 7 of treatment, and prior to treatment of the patient with iloperidone or the metabolite thereof.

In certain embodiments, the accounting comprises instructing the patient to ask a doctor or a pharmacist before commencing treatment with the milsaperidone if the patient is taking a prescription drug for gout.

In certain embodiments, the accounting comprises informing the patient of one or more symptoms of gout, or asking whether the patient is experiencing joint pain.

In certain embodiments, the accounting comprises instructing the patient to reduce or avoid consumption of alcohol, sugar-sweetened beverages and foods, high fructose corn syrup, or purine-rich foods.

In certain embodiments, the accounting comprises instructing the patient to reduce or avoid co-administration of the milsaperidone with any of a diuretic, low-dose aspirin, niacin, an immunosuppressant, or cyclosporine.

In certain embodiments, the accounting comprises initiating treatment with, or increasing a dose of a urate-lowering medication.

In certain embodiments, the accounting comprises instructing the patient to discuss the treatment with a rheumatologist or a primary care physician.

In certain embodiments, the accounting comprises monitoring the patient, or instructing the patient to self-monitor for a presence of a symptom of gout selected from pain, swelling, discoloration or redness, tenderness to touch, and warmth at an affected joint.

In certain embodiments, the accounting comprises assessing or having assessed whether the patient is afflicted with any one or more of: obesity; congestive heart failure; a metabolic syndrome; chronic kidney disease; hypertension (high blood pressure); psoriasis; cancer; or a genetic condition associated with increased urate.

In certain embodiments, the accounting comprises instructing the patient to reduce or avoid physical trauma or risk thereof.

In certain embodiments, the accounting comprises monitoring the patient for development of hypertension, chronic kidney disease, obesity, diabetes, nephrolithiasis, myocardial infarction, or congestive heart failure.

In a second aspect, a method is provided for reducing a possibility of an adverse consequence resulting from an increase in a serum urate level in a patient to whom a therapeutically effective amount of milsaperidone is being administered, comprising accounting for the increase in the serum urate level of the patient during treatment with the milsaperidone.

In certain embodiments, the treatment with milsaperidone results in the increase in the serum urate level of the patient, and the accounting has the effect of preventing, limiting a frequency of, or limiting a severity of a disease, a condition, or a symptom caused by hyperuricemia or gout.

In certain embodiments, the accounting comprises monitoring the serum urate level of the patient.

In certain embodiments, the monitoring comprises obtaining or having obtained a biological sample from the patient; and testing or having tested the biological sample to determine a concentration of urate in the biological sample; and performing the monitoring at one or more milestones selected from: on or about day 28 of treatment, on or about day 21 of treatment, on or about day 14 of treatment, on or about day 7 of treatment, and prior to treatment of the patient with iloperidone or the metabolite thereof.

In certain embodiments, the accounting comprises instructing the patient to ask a doctor or a pharmacist before commencing treatment with the milsaperidone if the patient is taking a prescription drug for gout.

In certain embodiments, the accounting comprises informing the patient of one or more symptoms of gout, or asking whether the patient is experiencing joint pain.

In certain embodiments, the accounting comprises instructing the patient to reduce or avoid consumption of alcohol, sugar-sweetened beverages and foods, high fructose corn syrup, or purine-rich foods.

In certain embodiments, the accounting comprises instructing the patient to reduce or avoid co-administration of the milsaperidone with any of a diuretic, low-dose aspirin, niacin, an immunosuppressant, or cyclosporine.

In certain embodiments, the accounting comprises initiating treatment with, or increasing a dose of a urate-lowering medication.

In certain embodiments, the accounting comprises instructing the patient to discuss the treatment with a rheumatologist or a primary care physician.

In certain embodiments, the accounting comprises monitoring the patient, or instructing the patient to self-monitor for a presence of a symptom of gout selected from pain, swelling, discoloration or redness, tenderness to touch, and warmth at an affected joint.

In certain embodiments, the accounting comprises assessing or having assessed whether the patient is afflicted with any one or more of: obesity, congestive heart failure, a metabolic syndrome, chronic kidney disease, hypertension (high blood pressure), psoriasis, cancer, or a genetic condition associated with increased urate; and monitoring the patient for development of hypertension, chronic kidney disease, obesity, diabetes, nephrolithiasis, myocardial infarction, or congestive heart failure.

In certain embodiments, the accounting comprises instructing the patient to reduce or avoid physical trauma or risk thereof.

In a third aspect, an improved method is provided, consisting essentially of treating a patient with iloperidone or a metabolite thereof. The improvement in the method comprises accounting for an increase in a serum urate level of the patient during treatment with the iloperidone or the metabolite thereof.

In certain embodiments, the patient may be a patient in need of treatment with iloperidone or a metabolite thereof.

In a fourth aspect, an improved method is provided, consisting essentially of treating a patient with 24 mg/day of iloperidone, given as 12 mg twice daily (bid), the improvement comprising accounting for an increase in a serum urate level of the patient during the treatment. In certain embodiments, the patient may be a patient in need of treatment with iloperidone or a metabolite thereof.

In a fifth aspect, an improved method is provided for the treatment of a patient in need thereof with iloperidone, an active metabolite of iloperidone such as milsaperidone, or a pharmaceutically acceptable salt of iloperidone or the metabolite thereof, wherein the patient has a history of gout. In such improved method, the improvement comprises: monitoring a serum urate level of the patient; and in an event that the serum urate level of the patient approaches or exceeds a reference limit or level, initiating treatment with, or increasing a dose of a urate lowering treatment.

In a sixth aspect, an improved method is provided for the treatment of a patient in need thereof with iloperidone, an active metabolite of iloperidone such as P88, or a pharmaceutically acceptable salt of iloperidone or the metabolite thereof, wherein the patient has a genotype associated with iloperidone-induced increases in serum urate concentration such as, e.g., a rs7442295 genotype at the SLC2A9 gene that includes one or more rs7442295(G) alleles.

In such improved method, the improvement comprises: monitoring a serum urate level of the patient; and in an event that the serum urate level of the patient approaches or exceeds a reference limit or level, initiating treatment with, or increasing a dose of a urate lowering treatment.

In a seventh aspect, an improved method is provided for the treatment of a patient in need thereof with a compound that is iloperidone, a pharmaceutically acceptable salt of iloperidone, P88, or a pharmaceutically acceptable salt of P88. In such improved method, the improvement comprises: monitoring a serum urate concentration (SUC) of the patient; and in an event that the SUC approaches or exceeds a reference limit or level, initiating treatment with, or increasing a dose of a urate lowering treatment.

These and other aspects, advantages and salient features of the invention will become apparent from the following detailed description, which, when taken in conjunction with the annexed drawings, where like parts are designated by like reference characters throughout the drawings, disclose embodiments of the invention.

Figure 1:
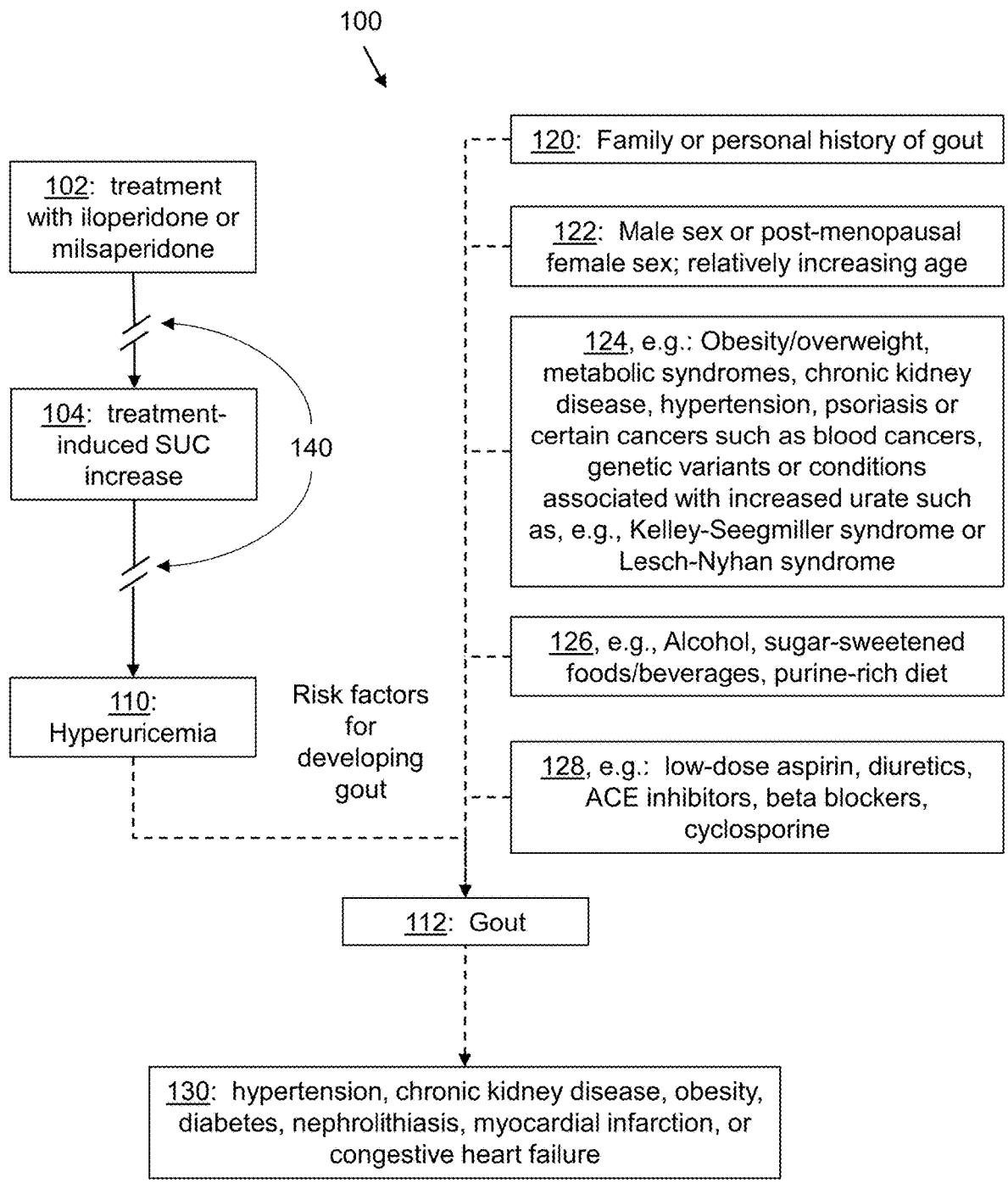
FIG. 1 illustrates aspects of an improved method of treating a patient with iloperidone or milsaperidone, including accounting for an increase in serum urate level, in accordance with embodiments of the disclosure.

The drawings are intended to depict only typical aspects of the disclosure, and therefore should not be considered as limiting the scope of the disclosure.

DETAILED DESCRIPTION OF THE INVENTION

In various embodiments of the invention, improved methods are described herein for treatment of patients with iloperidone, active metabolites of iloperidone, or pharmaceutically acceptable salts of iloperidone or active metabolites thereof. Such active metabolites may include P88, e.g., S-P88 (milsaperidone). Such improved methods are useful to safely and effectively treat a patient in need of treatment with iloperidone, while limiting, mitigating, reducing, or avoiding the risk of certain deleterious adverse events associated with the iloperidone treatment such as, e.g., hyperuricemia and gout.

As used herein, the terms "patient," "subject," and "individual" refer to a mammal that is afflicted with one or more disorders ameliorated by administration of iloperidone such as, e.g., schizophrenia, a schizophreniform disorder, bipolar I disorder, acute manic and mixed episodes associated with bipolar I disorder, agitation associated with Alzheimer's Disease, agitation associated with dementia, agitation associated with autism, Parkinson's Disease Psychosis, or another psychotic disease or disorder. Guinea pigs, dogs, cats, rats, mice, horses, cattle, sheep, and humans are examples of mammals within the scope of the meaning of the term. It will be understood that the most preferred patient is a human. A "patient in need of treatment with" iloperidone or milsaperidone refers to a patient suffering from, or diagnosed with a condition that is understood by a person of skill in the art, to be treated or treatable with iloperidone, milsaperidone, or a pharmaceutically acceptable salt of iloperidone or milsaperidone, such as (but not limited to) those conditions listed above.

It is also recognized that one skilled in the art may affect the disorders discussed herein by treating a patient presently afflicted with the disorders or by prophylactically treating a patient afflicted with the disorders with an effective amount of iloperidone, milsaperidone, or a pharmaceutically acceptable salt of iloperidone or milsaperidone. Thus, the terms "treatment" and "treating" are intended to refer to all processes wherein there may be a slowing, interrupting, arresting, controlling, or stopping of the progression of the diseases or disorders described herein, or a reduction in the frequency of episodes thereof, and is intended to include prophylactic treatment of such disorders. "Treatment" does not necessarily indicate a total elimination of all disorder symptoms, and may include improvement therein.

As used herein, the term "effective amount" as it relates to iloperidone, an active metabolite of iloperidone such as milsaperidone, or a pharmaceutically acceptable salt of iloperidone or milsaperidone, refers to an amount of the compound that is effective in treating the disorders described herein. Non-limiting exemplary effective amounts, or effective doses of iloperidone are disclosed in, e.g., U.S. Pat. Nos. 8,586,610, 9,138,432, 10,272,076, 10,441,580, and 10,987,346. For example, an exemplary effective amount or effective dose of iloperidone may be, e.g., 12 mg/day to 24 mg/day, which may be given in twice daily divided doses, e.g., 6 mg twice daily (bid) to 12 mg bid, and may particularly be, e.g., 12 mg/day, 14 mg/day, 16 mg/day, 18 mg/day, 20 mg/day, 22 mg/day, or 24 mg/day, which may be given as 6 mg bid, 7 mg bid, 8 mg bid, 9 mg bid, 10 mg bid, 11 mg bid, or 12 mg bid, following titration. Exemplary effective amounts, or effective doses, of R-P88 are disclosed in, e.g., U.S. Pat. No. 10,874,659. For example, an exemplary effective amount or effective dose of R-P88 may be, e.g., 1 mg/day to 24 mg/day, 6 mg/day to 24 mg/day, 12 mg/day to 24 mg/day, 6 mg/day to 18 mg/day, or 6 mg/day to 12 mg/day, e.g., 1, 2, 3, 4, 5, 6, 7, 8, 9, 10, 11, 12, 14, 16, 18, 20, 22, or 24 mg/day. Such daily doses may be given in twice daily divided doses, e.g., 6 mg/day to 18 mg/day may be given as 3 mg bid to 9 mg bid, following titration. Exemplary effective amounts or effective doses of S-P88 (milsaperidone) may be, e.g., about 1 to about 500 mg/day, or about 1 to about 300 mg/day, which may be administered, for example, in divided doses up to four times a day or in sustained release form. In particular, exemplary effective amounts, or effective doses of milsaperidone may be, e.g., 12 mg/day to 24 mg/day, which may be given in twice daily divided doses, e.g., 6 mg twice daily (bid) to 12 mg bid, and may particularly be, e.g., 12 mg/day, 14 mg/day, 16 mg/day, 18 mg/day, 20 mg/day, 22 mg/day, or 24 mg/day, which may be given in twice daily divided doses as 6 mg bid, 7 mg bid, 8 mg bid, 9 mg bid, 10 mg bid, 11 mg bid, or 12 mg bid, following titration.

With regard to dosing, qd (quaque die) refers to dosing once per day; and bid (bis in die) dosing typically means dosing once in the morning and once in the evening, generally no less than about 8 hours or more than about 16 hours apart, e.g., 10 to 14 hours apart, or 12 hours apart (Q12H).

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the milestone(s) includes one or more milestones). Ranges disclosed herein are inclusive and independently combinable (e.g., ranges of "up to about 25 mg, or, more specifically, about 5 mg to about 20 mg," is inclusive of the endpoints and all intermediate values of the ranges of "about 5 mg to about 25 mg," etc.).

With reference to FIG. 1, one aspect of the invention provides an improved method 100 consisting essentially of treating a patient with iloperidone or milsaperidone 102, or a pharmaceutically acceptable salt thereof, in which the improvement comprises accounting for an increase in a serum urate level of the patient during treatment of the patient with the iloperidone or milsaperidone at process 140. The treatment 102 may include treatment with milsaperidone, and may include administration of an effective amount as described herein above. In other embodiments, the treatment may include treatment with iloperidone, at an effective dose as further described herein above. In further embodiments, the treatment may include administration of an effective amount of a pharmaceutically acceptable salt of iloperidone or milsaperidone. In one particular example, the effective dose may be 12-24 mg/day, e.g., 24 mg/day of milsaperidone, which may be given in a twice daily divided dose of 6-12 mg bid, e.g., 12 mg bid. In another particular example, the effective dose may be 12-24 mg/day, e.g., 24 mg/day of iloperidone, which may be given in a twice daily divided dose of 6-12 mg bid, e.g., 12 mg bid. Such treatment with iloperidone or milsaperidone may result in an increase in the serum urate level (or serum urate concentration (SUC)) of the patient. For example, treatment with FANAPT® iloperidone at a dose of 24 mg/day given as 12 mg bid results in an increase of serum urate levels of approximately 27.2 µmol/L (0.457 mg/dL) compared to 0.1 µmol/L (0.002 mg/dL) in placebo group. The patient may be in need of treatment with iloperidone, milsaperidone, or a pharmaceutically acceptable salt thereof for control of symptoms and/or prevention of relapse of, e.g., schizophrenia, a schizophreniform disorder, bipolar I disorder, bipolar mania, acute manic and mixed episodes associated with bipolar I disorder, agitation associated with Alzheimer's Disease, agitation associated with dementia, agitation associated with autism, Parkinson's Disease Psychosis, and other psychotic diseases and disorders as is known and understood in the art.

Such increases in a patient's serum urate level 104 may result in the development of hyperuricemia 110. Hyperuricemia is a condition which may typically be asymptomatic at the outset, and in which levels of urate in the patient's blood are elevated relative to a reference range or limit over an extended period of time, i.e., the patient's serum urate levels exceed the upper limit of normal (ULN) relative to a selected reference range or limit. Various reference ranges or reference limits are known to those of skill in the art and may be used in the practice of embodiments of the invention including, e.g., those listed in Table 1.

TABLE 1

Exemplary SUC References

| Reference | Patient sex | Biological sample |
|---|---|---|
| about 300 µmol/L (about 5 mg/dL) | Male or Female | Serum, blood |
| About 360 µmol/L (about 6 mg/dL) | Male or Female | Serum, blood |

TABLE 1-continued

Exemplary SUC References

| Reference | Patient sex | Biological sample |
|---|---|---|
| about 380 µmol/L | Male or Female | Serum, blood |
| about 390 µmol/L (about 6.5 mg/dL) | Male or Female | Serum, blood |
| about 400 µmol/L (about 6.8 mg/dL) | Male or Female | Serum, blood |
| about 453 µmol/L | Male | Serum, blood |
| about 394 µmol/L | Female | Serum, blood |
| about 480 µmol/L (about 8 mg/dL) | Male or female | Serum, blood |
| 200-430 µmol/L | Male | Serum, blood |
| 140-360 µmol/L | Female | Serum, blood |
| 4.0-8.5 mg/dL | Male (adult) | Serum, blood |
| 2.7-7.3 mg/dL | Female (adult) | Serum, blood |
| 0.24-0.51 mmol/L | Male (adult) | Serum, blood |
| 0.16-0.43 mmol/L | Female (adult) | Serum, blood |

Regardless of whether a single reference value or a reference range is used, the value or the upper limit of the range may be described as the upper limit of normal (ULN). Additionally, either urate or uric acid levels may be compared to appropriate reference values or ranges corresponding to serum urate levels disclosed herein and known in the art.

The development of hyperuricemia 110 is a risk factor which may increase the likelihood that the patient will develop gout 112. Gout is a form of inflammatory arthritis that causes intense flares having a typical duration of one to two weeks, and being marked by pain which may be intense, swelling, discoloration or redness of the skin, tenderness to touch including sensitivity to touch as light as a bedsheet over the affected joint, and warmth or a sensation of the affected area being "on fire." In addition to joints, bursae and/or tendon sheaths may also be affected. Symptom onset may occur at night, and may particularly affect a joint of the hallux (big toe), although other joints may additionally or alternatively be affected, such as a knee, ankle, foot, hand, wrist, or elbow.

In addition to hyperuricemia 110, other risk factors for developing gout 112 are shown in FIG. 1. These risk factors for gout 112 include familial or personal history of gout 120, i.e., having a family (e.g., a parent or grandparent) with a history of gout, or a personal history of prior gout diagnosis; demographic attributes 122 such as, e.g., being of male sex, or of post-menopausal female sex, and/or being of relatively increasing age, or having one or more conditions 124 predisposing one to gout. Such conditions 124 include being overweight or obese, having a metabolic syndrome, e.g., high blood pressure, high blood sugar, abnormal cholesterol levels, and/or excess body fat around the waist; chronic kidney disease, hypertension, a condition that causes cells to turn over more rapidly than typical such as, e.g., psoriasis or certain cancers such as blood cancers, or a genetic condition associated with increased urate such as, e.g., Kelley-Seegmiller syndrome or Lesch-Nyhan syndrome.

Additional risk factors 126 for gout related to diet include the consumption of alcohol due to the associated prevention of uric acid elimination by the kidneys, consumption of sugar-sweetened foods and beverages such as soda, and consumption of high fructose corn syrup, as fructose breaks down into uric acid. A diet rich in purines, which break down into urate, may also contribute to gout risk. Foods rich in purines include organ meats such as liver, tripe, sweetbreads, brains, and kidneys; game meats such as goose, veal, and venison, seafood such as herring, scallops, mussels, codfish, tuna, trout, and haddock, red meat such as beef, lamb, pork, and bacon, turkey, especially processed deli turkey, gravy, and meat sauces.

Certain medications 128 may also increase risk of gout, including low-dose aspirin, certain medications used to control hypertension including diuretics (e.g., thiazide diuretics), angiotensin-converting enzyme (ACE) inhibitors, and beta blockers, as well as cyclosporine, which is used to treat certain autoimmune diseases and as an immunosuppressant or anti-rejection drug for people who have undergone an organ transplant.

Gout and hyperuricemia, if uncontrolled or insufficiently controlled, may directly and/or indirectly increase the likelihood that the patient will develop other conditions 130 such as, e.g., hypertension, chronic kidney disease, obesity, diabetes, nephrolithiasis (kidney stones), myocardial infarction (heart attack), and/or congestive heart failure.

Accordingly, it is desirable when treating 102 a patient with iloperidone, milsaperidone, or another drug known to cause an increase in serum urate concentration (SUC) 104, to account for this increase during treatment, e.g. via a process 140, thereby mitigating or controlling the increase in SUC, and consequently, mitigating, controlling, limiting, or avoiding the chain of consequences and conditions which can follow therefrom, including but not limited to the development of gout 112 and conditions 130 caused by gout.

Figure 2:
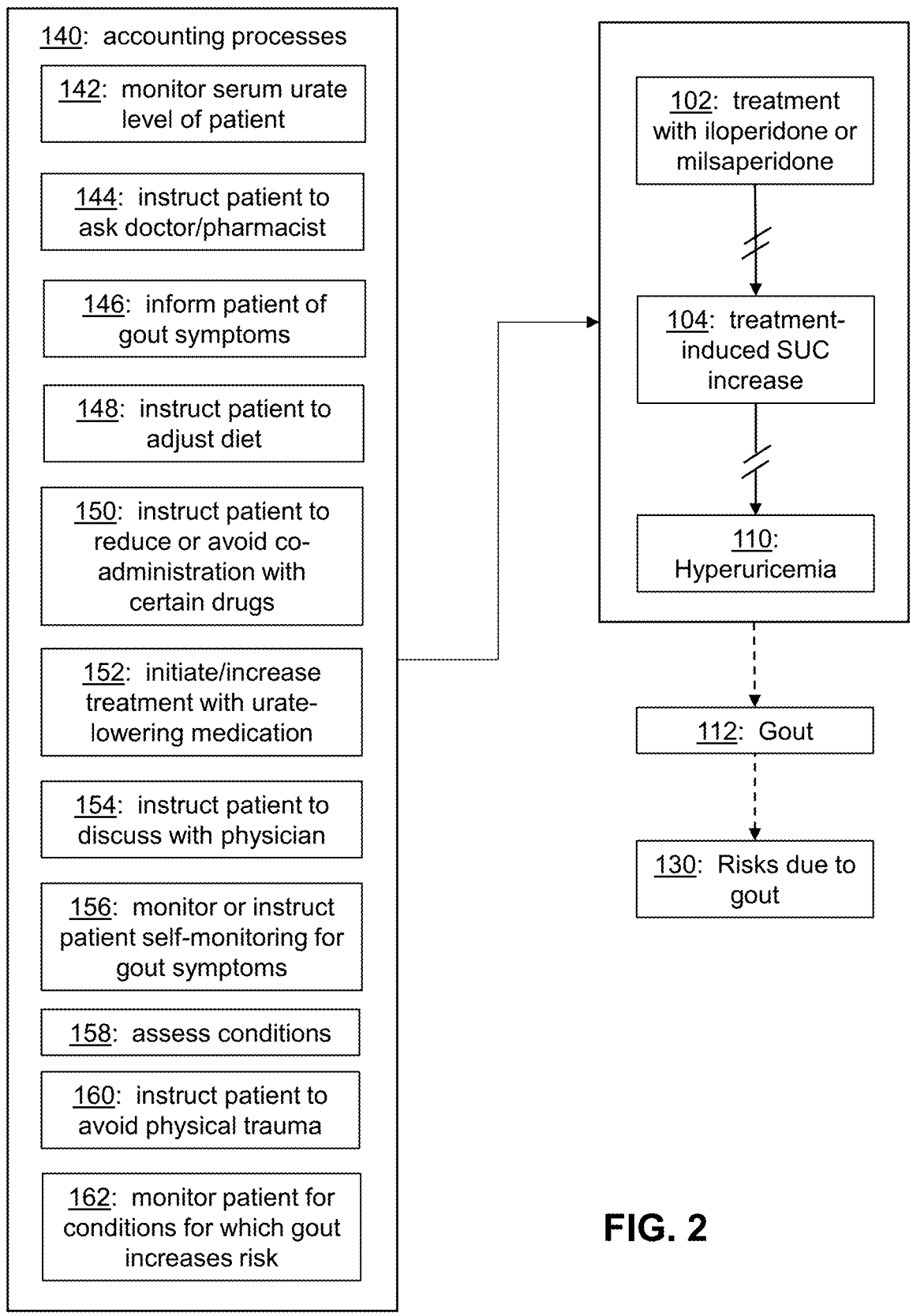
FIG. 2 illustrates a number of processes to account for a treatment-induced increase in serum urate concentration (SUC), in accordance with embodiments of the disclosure.

With reference to FIG. 2, various processes 140 for accounting for the increase in SUC are contemplated herein. In certain embodiments, accounting for the patient's SUC increase at process 140 includes a process 142 of monitoring the serum urate level of the patient. The monitoring at process 142 may include obtaining or having obtained a biological sample from the patient, and testing or having tested the biological sample to determine a concentration of urate in the biological sample. In this context, "obtaining" may refer to collecting or acquiring a biological sample from the patient, while "having obtained" may refer to referring, instructing, or otherwise causing another individual, e.g., a medical or healthcare professional, to perform the obtaining. "Having obtained" may also refer to having previously caused the obtaining to have been performed. Similarly, in this context, "testing" the biological sample may refer to physically performing the steps to quantify the concentration of urate in the biological sample, while "having tested" the biological sample may refer to referring, instructing, or otherwise causing another individual, e.g., a medical or healthcare professional, to carry out the testing. The expression, "having tested" may also refer to having previously caused the performance of the testing.

Such monitoring at process 142 may be performed at one or more milestones relative to treatment of the patient with iloperidone, milsaperidone, or a pharmaceutically acceptable salt of iloperidone or milsaperidone. Such milestones may include, e.g., prior to initiation of treatment with the iloperidone, milsaperidone, or a salt of iloperidone or milsaperidone, on or about day 28 of treatment, on or about day 21 of treatment, on or about day 14 of treatment, and on or about day 7 of treatment. In various embodiments, the monitoring may be performed at one, two, three, four, or all five of the foregoing milestones. The monitoring may further be continued after day 28, for example, periodically at intervals of, e.g., every approximately 28 days thereafter. Such periodic monitoring may continue for a prespecified period of time, or throughout the duration of the patient's treatment. Where the periodic monitoring continues for a prespecified period of time, the prespecified period may be tied to a particular unit of time, e.g., as measured in weeks, months, or years. Alternatively, the monitoring may be continued until a milestone is reached. Such milestone may be defined by, e.g., the patient reaching a steady state or substantially steady state serum urate concentration over a certain number of monitoring events.

In certain embodiments, the process 140 of accounting for the patient's SUC increase includes a process 144 of instructing the patient to ask a doctor or a pharmacist before commencing treatment with the iloperidone or milsaperidone if the patient is taking a prescription drug for gout. For example, the patient may ask the doctor or pharmacist for advice regarding symptoms to monitor, or other aspects of treatment.

In certain embodiments, the process 140 of accounting for the patient's SUC increase includes the process 146 of informing the patient of one or more symptoms of gout. This information may enable the patient to self-monitor for the development of any gout symptoms, and to seek appropriate treatment promptly in the event that any such symptoms develop. The process 146 may further include asking whether the patient is experiencing any joint pain.

In certain embodiments, the process 140 of accounting for the patient's SUC increase includes a process 148 of instructing the patient to make adjustments to their diet to reduce, limit, or avoid consumption of foods or beverages 126 (FIG. 1) that increase risk of gout. Such foods and beverages include alcohol, sugar-sweetened beverages and foods, high fructose corn syrup, and purine-rich foods. These instructions, when followed by the patient, may enable the patient to make changes in his or her dietary habits that will reduce or avoid the likelihood of developing symptomatic gout during treatment with iloperidone or milsaperidone.

In certain embodiments, the process 140 of accounting for the patient's SUC increase includes a process 150 of instructing the patient to reduce or avoid co-administration of the iloperidone or the metabolite thereof with certain medications 128 (FIG. 1) that increase the risk of gout such as, e.g., diuretics, low-dose aspirin, niacin, immunosuppressants, and cyclosporine. These instructions, when followed by the patient, may enable the patient to reduce likelihood, or avoid augmenting risk relative to baseline, of developing symptomatic gout, or to prevent the development of symptomatic gout during treatment with iloperidone or milsaperidone.

In certain embodiments, the process 140 of accounting for the patient's SUC increase includes a process 152 of initiating treatment with a urate-lowering medication. If the patient is already being administered a urate-lowering medication, the accounting process 140 may include increasing a dose of the urate-lowering medication, and/or adding a second urate-lowering medication to the patient's treatment protocol. Urate-lowering medications are known to those of skill in the art and may include, e.g., Probenecid, Allopurinol, Febuxostat, Pegloticase, and various uricosuric agents, e.g., benzbromarone. Administration of such agents, either alone or in combination with one another, may counteract the effects on SUC that are attributable to the treatment with iloperidone or milsaperidone, and thereby reduce SUC. This in turn lowers risk of gout, and may treat, prevent, ameliorate, or reduce the severity and/or duration of a gout attack.

In certain embodiments, the process 140 of accounting for the patient's SUC increase may include a process 154 of instructing the patient to discuss his or her treatment with iloperidone or milsaperidone with a physician such as a rheumatologist or a primary care physician. This information will enable the physician to make an assessment as to any lifestyle or medication changes needed to reduce gout risk, or treat, prevent, or ameliorate a gout attack, and provide recommendations to the patient in accordance with the assessment.

In certain embodiments, the process 140 of accounting for the patient's SUC increase includes a process 156 of monitoring the patient, or instructing the patient to self-monitor for a presence of a symptom of gout. Symptoms of gout are known in the art, and include pain, swelling, discoloration or redness, tenderness to touch, and warmth at an affected joint.

In certain embodiments, the process 140 of accounting for the patient's SUC increase includes a process 158 of assessing or having assessed whether the patient is afflicted with any one or more conditions 124 (FIG. 1) that are known to be risk factors for developing gout. Such conditions 124 include, e.g., being overweight or obese, congestive heart failure, a metabolic syndrome, e.g., high blood pressure, high blood sugar, abnormal cholesterol levels, or excess body fat around the waist; chronic kidney disease; hypertension (high blood pressure); conditions that cause cells to turn over more rapidly than normal such as, e.g., psoriasis and certain cancers such as blood cancers; and genetic conditions associated with increased urate such as, e.g., Kelley-Seegmiller syndrome, Lesch-Nyhan syndrome. Patients determined to have a condition 124 which increases risk of gout may be candidates for increased monitoring and/or more aggressive interventions such as, e.g., one or more of processes 142, 144, 146, 148, 150, 152, 154, 156, 160, 162 as described herein.

In certain embodiments, the process 140 of accounting for the patient's SUC increase includes a process 160 of instructing the patient to reduce or avoid physical trauma or risk thereof. This may include instructing the patient to reduce or avoid activities likely to cause physical trauma. Experiencing recent surgery, physical trauma, or even receiving a vaccination may, in certain patients and instances, trigger a gout attack. Accordingly, gout risk may be reduced or avoided by limiting exposure to such experiences, to the extent possible or practical.

In certain embodiments, the process 140 of accounting for the patient's SUC increase includes a process 162 of monitoring the patient for the development of one or more conditions 130 for which patients with gout are at increased risk. Such conditions include, e.g., hypertension, chronic kidney disease, obesity, diabetes, nephrolithiasis (kidney stones), myocardial infarction (heart attack), or congestive heart failure, or symptoms of any of the foregoing. Such monitoring may facilitate early intervention in the event that any one or more such conditions 130 develops in the patient.

In certain embodiments, the process 140 of accounting for the patient's SUC increase, e.g. through any one or more of processes 142, 144, 146, 148, 150, 152, 154, 156, 158, 160, and/or 162, has the effect of preventing, limiting a frequency, duration, and/or severity of a gout attack, and/or of treating or preventing a disease, a condition, or a symptom caused by hyperuricemia or gout, e.g., any of the conditions 130 described herein.

In a second aspect of the invention, an improvement is provided in a method of treatment of a patient with a compound that is iloperidone, milsaperidone, or a pharmaceutically acceptable salt of iloperidone or milsaperidone. The patient may be in need of treatment with iloperidone, milsaperidone, or the salt thereof for control of symptoms and/or prevention of relapse of, e.g., schizophrenia, a schizophreniform disorder, bipolar I disorder, bipolar mania, acute manic and mixed episodes associated with bipolar I disorder, agitation associated with Alzheimer's Disease, agitation associated with dementia, agitation associated with autism, Parkinson's Disease Psychosis, and other psychotic diseases and disorders as is known and understood in the art. In certain embodiments, the patient's treatment may include administration of milsaperidone at a dose of up to 24 mg/day, which may be given in a divided dose twice daily. In other embodiments, the patient's treatment may include administration of iloperidone at a dose of up to 24 mg/day, which may be given in a divided dose twice daily. In certain embodiments the dose of iloperidone or milsaperidone may particularly be 24 mg/day, which may be given as 12 mg bid, or other doses such as, e.g., 20 mg/day, 16 mg/day, or 12 mg/day, which may be given as 10 mg bid, 8 mg bid, or 6 mg bid, respectively. Additionally, the patient may have a personal history of gout, i.e., may have experienced symptoms of gout previously, or a familial history of gout, for example, a first degree relative such as a sibling or a parent who has a personal history of gout.

According to the present embodiment, the improvement in such treatment includes monitoring the patient's serum urate concentration or level. Such monitoring may include obtaining a biological sample such as, e.g., blood or plasma from the patient; and testing the biological sample to determine the serum urate concentration in the biological sample. The patient's serum urate concentration (SUC) may then be compared to a reference SUC. Reference levels for SUCs are known to those of ordinary skill in the art, but may include, e.g., those listed in Table 1 above. Regardless of whether a reference value or a reference range is used, the value or the upper limit of the range may be described as the upper limit of normal (ULN).

Such monitoring may be performed at one or more milestones relative to treatment of the patient with iloperidone, milsaperidone, or a pharmaceutically acceptable salt of iloperidone or milsaperidone such as, e.g., prior to administration, on or about day 28 of treatment, on or about day 21 of treatment, on or about day 14 of treatment, and on or about day 7 of treatment. In various embodiments, the monitoring may be performed at one, two, three, four, or all five of the foregoing milestones. The monitoring may further be continued after day 28, for example, periodically at intervals of, e.g., every approximately 28 days thereafter. Such periodic monitoring may continue for a prespecified period of time, or throughout a duration of the patient's treatment. Where the periodic monitoring continues for a prespecified period of time, the prespecified period may be tied to a particular unit of time, e.g., as measured in weeks, months, or years. Alternatively, the monitoring may be continued until a milestone is reached. Such milestone may be defined by, e.g., the patient reaching a steady state or substantially steady state serum urate concentration over a certain number of monitoring events.

The method may further include determining whether the patient is currently being treated for gout, e.g., with a uric acid reducing medication such as, e.g., Probenecid, Allopurinol, Febuxostat, Pegloticase, or a uricosuric agent, e.g., benzbromarone.

In the event that the patient's SUC exceeds a reference level, and the patient is not currently being treated for gout, the improved method includes initiating and maintaining treatment with a uric acid reducing medication while the patient is being treated with iloperidone or milsaperidone.

In the event that the patient's SUC exceeds the reference level, and the patient is currently being treated for gout, the improved method includes increasing the dose of the uric acid reducing medication being administered to the patient while the patient is being treated with iloperidone. Alternatively and/or additionally, treatment with a different uric acid reducing medication may be initiated, either alone or in combination with the first uric acid reducing medication.

In the event that the patient's SUC is within the reference level, and the patient is not currently being treated for gout, treatment with iloperidone, milsaperidone, or a pharmaceutically acceptable salt of iloperidone or milsaperidone may be maintained in the absence of any uric acid reducing medication, subject to the outcome of any future or ongoing monitoring of the patient's SUC.

In the event that the patient's SUC is within the reference level, and the patient is currently being treated for gout, both the treatment with iloperidone or milsaperidone and the treatment with uric acid reducing medication may be maintained at their respective dosages, subject to the outcome of any future or ongoing monitoring of the patient's SUC.

In the event that the patient's SUC is within the reference level, but is trending toward or approaching the reference level, which may occur at, e.g., day 7, day 14, day 21, day 28, or other milestone in treatment, various steps may be taken. In one example, monitoring may be increased in frequency and/or extended in duration. In another example, treatment with a urate-lowering medication or upward dose adjustment of the urate-lowering medication may be employed prophylactically to prevent the patient's SUC from exceeding the reference level. The patient may be deemed to be approaching the reference level when, e.g., the patient's SUC has increased to within about 5%, about 10%, about 15%, or about 20% of the reference level, when the patient's SUC is within a prespecified range encompassing the reference level (e.g., ±5 µmol/L, ±10 µmol/L, ±15 µmol/L, etc.), and so on, as may be understood by one of skill in the art. The patient may also be deemed to be approaching the reference level when, e.g., the patient's SUC has increased over one or more milestones and is on a trajectory that can be extrapolated to a value that exceeds the applicable reference level. For example, if on day 14 or day 21 after initiation of iloperidone or milsaperidone treatment, the patient's SUC is on an upward trajectory that has not yet exceeded the reference limit, but it appears that it may or will by day 28 assuming maintenance of treatment, then the patient may be deemed to be approaching the reference level, and prophylactic action may be taken as described herein.

Process 152 (FIG. 2) of initiating and/or increasing the dose of a uric acid reducing treatment as described herein provides the benefit of reducing a likelihood that the patient will develop hyperuricemia and suffer negative consequences thereof such as, e.g., an attack of gout. In various embodiments, the patient may be male, or may be female.

In certain embodiments, the patient may be found or known to be a carrier of a variant SLC2A9 allele that is associated with increases in serum urate concentration that are induced by treatment with iloperidone, milsaperidone, or a pharmaceutically acceptable salt of iloperidone or milsaperidone. For example, the patient may have genotype that includes one or more SLC2A9 rs7442295 (G) alleles. In certain embodiments, the patient may particularly be homozygous for the rs7442295 (G) allele (rs7442295-G/G) at the SLC2A9 gene. Carrying a one or more rs7442295 (G) alleles, e.g., two rs7442295 (G) alleles (i.e., rs7442295 (G/G) genotype) at the SLC2A9 locus may constitute a condition 124 (FIG. 1) which increases a patient's risk of developing gout, and may be accounted for as described herein. The patient's genotype at the relevant locus may be determined using methods known to one of skill in the art, and/or as described in the Examples set forth herein. In certain embodiments, the patient's SLC2A9 genotype, once known, may contribute to a determination as to whether or how aggressively to account for the patient's SUC increase by treating the patient with a urate-lowering medication at process 152 (FIG. 2) according to the improved method described herein. For example, a patient having a homozygous rs7442295-G/G genotype may be treated more aggressively with urate-lowering medication at process 152 than an individual having a heterozygous rs7442295-A/G genotype or a homozygous rs7442295-A/A genotype.

According to a third aspect of the disclosure, another improved method may be provided for the treatment of a patient in need thereof with iloperidone, milsaperidone, or a pharmaceutically acceptable salt of iloperidone or milsaperidone, wherein the patient is a carrier of a variant SLC2A9 allele that is associated with increases in serum urate concentration that are induced by, or associated with treatment with iloperidone, milsaperidone, or a pharmaceutically acceptable salt of iloperidone or milsaperidone. The variant SLC2A9 allele may be a rs7442295 (G) allele. In certain embodiments, the patient may carry at least one, or more particularly two rs7442295 (G) alleles, i.e., a rs7442295 (G/G) genotype. The patient's SLC2A9 genotype may be determined as described herein, and/or from consultation with the patient's medical records, in the event that the test, or a test including the relevant locus, had previously been performed. According to the present embodiment, the improved method comprises monitoring a serum urate level of the patient; and in an event that the serum urate level of the patient approaches or exceeds a reference level, initiating treatment with, or increasing a dose of a urate lowering treatment.

The patient may be in need of treatment with iloperidone, milsaperidone, or a pharmaceutically acceptable salt of iloperidone or milsaperidone for control of symptoms and/or prevention of relapse of, e.g., schizophrenia, a schizophreniform disorder, bipolar I disorder, bipolar mania, acute manic and mixed episodes associated with bipolar I disorder, agitation associated with Alzheimer's Disease, agitation associated with dementia, agitation associated with autism, Parkinson's Disease Psychosis, and other psychotic diseases and disorders as is known and understood in the art. In certain embodiments, the patient's treatment may include administration of milsaperidone at a dose of up to 24 mg/day, which may be given in a divided dose twice daily. In certain embodiments, the patient's treatment may include administration of iloperidone at a dose of up to 24 mg/day, which may be given in a divided dose twice daily. In certain embodiments the dose of iloperidone or milsaperidone may particularly be 24 mg/day, which may be given as 12 mg bid, or other doses such as, e.g., 20 mg/day, 16 mg/day, or 12 mg/day, which may be given as 10 mg bid, 8 mg bid, or 6 mg bid, respectively. Additionally, the patient may or may not have a personal history of gout, i.e., may have experienced symptoms of gout previously, or a familial history of gout, such as a first degree relative such as a sibling or a parent who has a personal history of gout.

According to the present aspect of the invention, the improvement in such treatment includes monitoring the patient's serum urate concentration or level. Such monitoring may include obtaining a biological sample such as, e.g., blood or plasma from the patient; and testing the biological sample to determine the serum urate concentration in the biological sample. The patient's serum urate concentration (SUC) may then be compared to a reference SUC. Reference levels for SUCs are known to those of ordinary skill in the art. Exemplary reference SUC levels are provided in Table 1 above. In certain embodiments, the patient may be male, or may be female.

Monitoring as described herein may be performed at one or more milestones relative to treatment with iloperidone, milsaperidone, or a pharmaceutically acceptable salt of iloperidone or milsaperidone, such as, e.g., prior to administration, on or about day 28 of treatment, on or about day 21 of treatment, on or about day 14 of treatment, and on or about day 7 of treatment. In various embodiments, the monitoring may be performed at one, two, three, four, or all five of the foregoing milestones. Further, the monitoring may be continued after day 28, for example, periodically at intervals of, e.g., every approximately 28 days thereafter. Such periodic monitoring may continue for a prespecified period of time, or throughout a duration of the patient's treatment. Where the periodic monitoring continues for a prespecified period of time, the prespecified period may be tied to a particular unit of time, e.g., as measured in weeks, months, or years. Alternatively, the monitoring may be continued until a milestone that may be defined by the patient reaching a steady state or substantially steady state serum urate concentration, for example, over a certain number of monitoring events.

The method may further include determining whether the patient is currently being treated for gout, e.g., with a uric acid reducing medication such as, e.g., Probenecid, Allopurinol, Febuxostat, Pegloticase, or a uricosuric agent, e.g., benzbromarone, particularly in an embodiment in which the individual is a carrier of a genetic variant that is associated with increases in serum urate concentrations induced by treatment with iloperidone, milsaperidone, or a pharmaceutically acceptable salt of iloperidone or milsaperidone. Such a genotype may be, e.g., rs7442295-G/G.

In the event that the patient's SUC at one or more of day 7, day 14, day 21, day 28, or other milestone exceeds the reference level, and the patient is not currently being treated for gout, the improved method includes initiating treatment with a uric acid reducing medication while the patient is being treated with iloperidone, milsaperidone, or a pharmaceutically acceptable salt of iloperidone or milsaperidone.

In the event that the patient's SUC at one or more of day 7, day 14, day 21, day 28, or other milestone exceeds the reference level, and the patient is currently being treated for gout, the improved method includes increasing the dose of the uric acid reducing medication being administered to the patient while the patient is being treated with iloperidone or milsaperidone. Alternatively and/or additionally, treatment with a different uric acid reducing medication may be initiated, either alone or in combination with the first uric acid reducing medication.

In the event that the patient's SUC at day 7, day 14, day 21, day 28, or other milestone is within the reference level, and the patient is not currently being treated for gout, treatment with iloperidone, milsaperidone, or a pharmaceutically acceptable salt of iloperidone or milsaperidone may be maintained in the absence of any uric acid reducing medication, subject to the outcome of any future or ongoing monitoring of the patient's SUC.

In the event that the patient's SUC at day 7, day 14, day 21, day 28, or other milestone is within the reference level, and the patient is currently being treated for gout, both the treatment with iloperidone, milsaperidone, or a pharmaceutically acceptable salt of iloperidone or milsaperidone, and the uric acid reducing medication may be maintained at their respective dosages, subject to the outcome of any future or ongoing monitoring of the patient's SUC.

In the event that the patient's SUC at one or more of day 7, day 14, day 21, day 28, or other milestone is within the reference level, but is trending toward or approaching the reference level, various steps may be taken. In one example, monitoring may be increased in frequency and/or extended in duration. In another example, treatment with a urate-lowering medication or upward dose adjustment of an existing urate-lowering medication may be employed prophylactically to prevent the patient's SUC from exceeding the reference level at a next or future milestone. The patient may be deemed to be approaching the reference level when, e.g., the patient's SUC has increased to within about 5%, about 10%, about 15%, or about 20% of the reference level, when the patient's SUC is within a prespecified range encompassing the reference level (e.g., ±5 μmol/L, ±10 μmol/L, ±15 μmol/L, etc.), and so on, as may be understood by one of skill in the art. The patient may also be deemed to be approaching the reference level when, e.g., the patient's SUC has increased over one or more milestones and is on a trajectory that can be extrapolated to a value that may or will exceed the reference level. For example, if on day 14 or day 21 after initiation of treatment with iloperidone, milsaperidone, or a pharmaceutically acceptable salt of iloperidone or milsaperidone, the patient's SUC is on an upward trajectory that has not yet exceeded the reference limit, but it appears that it may, e.g., by day 28, assuming maintenance of treatment, then the patient may be deemed to be approaching the reference level, and prophylactic action may be taken as described herein.

Initiating and/or increasing the dose of a uric acid reducing medication as described herein provides the benefit of reducing a likelihood that the patient will develop hyperuricemia and suffer negative consequences thereof such as, e.g., an attack of gout.

According to a fourth aspect of the disclosure, another improved method may be provided for the treatment of a patient in need thereof with iloperidone, milsaperidone, or a pharmaceutically acceptable salt of iloperidone or milsaperidone, regardless of whether or not the patient has a history of gout. According to the present embodiment, the improved method comprises monitoring a serum urate level of the patient; and in an event that the serum urate level of the patient approaches or exceeds a reference level, initiating treatment with, or increasing a dose of a urate lowering treatment. In certain embodiments, it may be unknown, e.g., to the patient and/or the patient's medical provider, whether the patient has a history (e.g. personal, familial, etc.) of gout.

The patient may be in need of treatment with iloperidone, milsaperidone, or a pharmaceutically acceptable salt of iloperidone or milsaperidone for control of symptoms and/or prevention of relapse of, e.g., schizophrenia, a schizophreniform disorder, bipolar I disorder, bipolar mania, acute manic and mixed episodes associated with bipolar I disorder, agitation associated with Alzheimer's Disease, agitation associated with dementia, agitation associated with autism, Parkinson's Disease Psychosis, and other psychotic diseases and disorders as is known and understood in the art. In certain embodiments, the patient's treatment may include administration of milsaperidone at a dose of up to 24 mg/day, which may be given in a divided dose twice daily. In certain embodiments, the patient's treatment may include administration of iloperidone at a dose of up to 24 mg/day, which may be given in a divided dose twice daily. In certain embodiments the dose of iloperidone or milsaperidone may particularly be 24 mg/day, which may be given as 12 mg bid, or other doses such as, e.g., 20 mg/day, 16 mg/day, or 12 mg/day, which may be given as 10 mg bid, 8 mg bid, or 6 mg bid, respectively.

According to the present embodiment, the improvement in such treatment includes monitoring the patient's serum urate concentration or level. Such monitoring may include obtaining a biological sample such as, e.g., blood or plasma from the patient; and testing the biological sample to determine the serum urate concentration in the biological sample. The patient's serum urate concentration (SUC) may then be compared to a reference SUC. Reference levels for SUCs are known to those of ordinary skill in the art, but may include those provided above in Table 1. In certain embodiments, the patient may be male, or may be female.

Monitoring as described herein may be performed at one or more milestones relative to treatment with iloperidone, milsaperidone, or a pharmaceutically acceptable salt of iloperidone or milsaperidone, such as, e.g., prior to administration, on or about day 28 of treatment, on or about day 21 of treatment, on or about day 14 of treatment, and on or about day 7 of treatment. In various embodiments, the monitoring may be performed at one, two, three, four, or all five of the foregoing milestones. Further, the monitoring may be continued after day 28, for example, periodically at intervals of, e.g., every approximately 28 days thereafter. Such periodic monitoring may continue for a prespecified period of time, or throughout the duration of the patient's treatment. Where the periodic monitoring continues for a prespecified period of time, the prespecified period may be tied to a particular unit of time, e.g., as measured in weeks, months, or years. Alternatively, the monitoring may be continued until a milestone that may be defined by the patient reaching a steady state or substantially steady state serum urate concentration, for example, over a certain number of monitoring events.

The method may further include determining whether the patient is currently being treated for gout, e.g., with a uric acid reducing medication such as, e.g., Probenecid, Allopurinol, Febuxostat, Pegloticase, or a uricosuric agent such as, e.g., benzbromarone, particularly in an embodiment in which the individual is a carrier of a genetic variant that is associated with increases in serum urate concentrations induced by treatment with iloperidone, milsaperidone, or a pharmaceutically acceptable salt of iloperidone or milsaperidone. Such a genotype may be, e.g., rs7442295-G/G, which may be determined as described elsewhere herein.

In the event that the patient's SUC at one or more of day 7, day 14, day 21, day 28, or other milestone exceeds the reference level, and the patient is not currently being treated for gout, the improved method includes initiating treatment with a uric acid reducing medication while the patient is being treated with iloperidone, milsaperidone, or a pharmaceutically acceptable salt of iloperidone or milsaperidone.

In the event that the patient's SUC at one or more of day 7, day 14, day 21, day 28, or other milestone exceeds the reference level, and the patient is currently being treated for gout, the improved method includes increasing the dose of the uric acid reducing medication being administered to the patient while the patient is being treated with iloperidone. Alternatively and/or additionally, treatment with a different uric acid reducing medication may be initiated, either alone or in combination with the first uric acid reducing medication.

In the event that the patient's SUC at day 7, day 14, day 21, day 28, or other milestone is within the reference level, and the patient is not currently being treated for gout, treatment with iloperidone, milsaperidone, or a pharmaceutically acceptable salt of iloperidone or milsaperidone may be maintained in the absence of any uric acid reducing medication, subject to the outcome of any future or ongoing monitoring of the patient's SUC.

In the event that the patient's SUC at day 7, day 14, day 21, day 28, or other milestone is within the reference level, and the patient is currently being treated for gout, both the treatment with iloperidone, milsaperidone, or a pharmaceutically acceptable salt of iloperidone or milsaperidone, and the uric acid reducing medication may be maintained at their respective dosages, subject to the outcome of any future or ongoing monitoring of the patient's SUC.

In the event that the patient's SUC at one or more of day 7, day 14, day 21, day 28, or other milestone is within the reference level, but is trending toward or approaching the reference level, various steps may be taken. In one example, monitoring may be increased in frequency and/or extended in duration. In another example, treatment with a urate-lowering medication or upward dose adjustment of an existing urate-lowering medication may be employed prophylactically to prevent the patient's SUC from exceeding the reference level at a next or future milestone. The patient may be deemed to be approaching the reference level when, e.g., the patient's SUC has increased to within about 5%, about 10%, about 15%, or about 20% of the reference level, when the patient's SUC is within a prespecified range encompassing the reference level (e.g., ±5 µmol/L, ±10 µmol/L, ±15 µmol/L, etc.), and so on, as may be understood by one of skill in the art. The patient may also be deemed to be approaching the reference level when, e.g., the patient's SUC has increased over one or more milestones and is on a trajectory that can be extrapolated to a value that may or will exceed the reference level. For example, if on day 14 or day 21 after initiation of treatment with iloperidone, milsaperidone, or a pharmaceutically acceptable salt of iloperidone or milsaperidone, the patient's SUC is on an upward trajectory that has not yet exceeded the reference limit, but it appears that it may, e.g., by day 28, assuming maintenance of treatment, then the patient may be deemed to be approaching the reference level, and prophylactic action may be taken as described herein.

Initiating and/or increasing the dose of a uric acid reducing medication as described herein provides the benefit of reducing a likelihood that the patient will develop hyperuricemia and suffer negative consequences thereof such as, e.g., an attack of gout.

The skilled artisan will appreciate that additional preferred embodiments may be selected by combining the preferred embodiments above, or by reference to the examples given herein.

EXAMPLES

Example 1

A multi-center, randomized, double-blind, placebo-controlled study ("Study 3201") is performed to evaluate the safety and efficacy of iloperidone for four (4) weeks in the treatment of patients with acute manic episodes associated with bipolar I disorder. Patients in the study are randomized to orally receive either iloperidone at a dose of 24 mg/day given in a divided dose as 12 mg twice daily (bid), or matched placebo.

Figure 3:
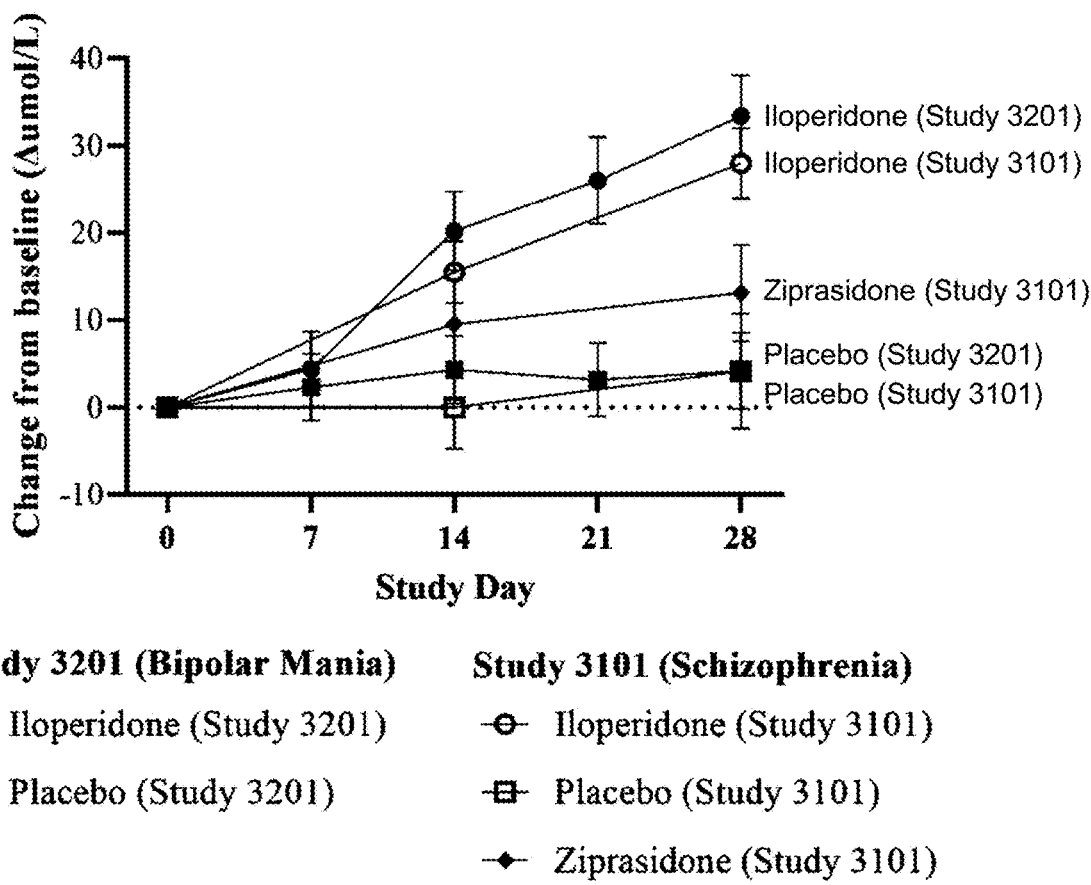
FIG. 3 plots the mean change from baseline to day 28 for serum urate in observed cases over time in the study described in Example 1 (patients with bipolar mania) and the study described in Example 2 (patients with schizophrenia). In the figure, error bars represent standard error of the mean (SEM).

Analysis of laboratory chemistry results reveal that at Day 28, patients receiving iloperidone have 4-fold greater increases in serum urate from baseline compared to placebo groups (33.4 µmol/L change for iloperidone; 4.2 µmol/L change for placebo group). These increases are illustrated in FIG. 3 using solid data points. Patient data are analyzed using an ANCOVA model, and reveal a statistically significant increase in serum urate for iloperidone compared to placebo (Table 2). The LS mean change from baseline to endpoint is an increase of 27.2 µmol/L for iloperidone compared to 0.1 µmol/L for placebo.

TABLE 2

| | Study 3201 (Bipolar Mania) ANCOVA Results | | | |
|---|---|---|---|---|
| Visit | Iloperidone LS Mean Change (SE), n | Placebo LS Mean Change (SE), n | LS Mean Difference (95% CI) | p-value |
| Baseline | 323.0 (77.13), 206 | 328.5 (84.6), 208 | — | — |
| Day 7 | −2.7 (−4.07), 199 | −4.0 (−4.11), 196 | 1.3 (−9.29, 11.88) | 0.8098 |
| Day 14 | 12.6 (−4.28), 173 | −2.7 (−4.24), 186 | 15.3 (4.50, 26.15) | 0.0057 |
| Day 21 | 19.1 (−5.24), 157 | −1.9 (−5.07), 166 | 21.0 (8.91, 33.18) | 0.0007 |
| Day 28 | 27.2 (−4.93), 142 | 0.1 (−4.77), 154 | 27.1 (14.94, 39.20) | <0.0001 |

ANCOVA = Analysis of Covariance.
CI = Confidence Interval.
LS = Least Squares.
LS means, CIs, and p-values are based on ANCOVA model with main effects of treatment group and pooled site, and baseline as a covariant. All p values represent the difference between iloperidone and placebo.

To test the hypothesis of altered urate serum levels in association with variants in the SLC2A9 gene, whole genome sequencing is conducted from blood samples, genotype status is obtained through standard data analysis, and linear models for SLC2A9 variants are performed on urate concentration in samples collected at baseline (corrected for PCs, age, sex) and samples collected at the end of the study (EOS).

One of the most significant variants detected is rs7442295 (p-value $10^{-5}$ (BETA=−23.12). The more common allele, rs7442295(A), is associated with higher baseline serum urate and hyperuricemia (defined as serum urate concentration greater than 400 µmol/l), with a reported odds ratio of 1.89 (CI: 1.36-2.61, p=$5 \times 10^{-5}$). Overall, 79% of white Europeans carry one or two rs7442295(A) alleles, leading to higher serum urate levels. Each copy leads to an average increase in baseline serum urate concentration of 20 µmol/l, and an approximate doubling of risk for hyperuricemia. The rs7442295 variant has a global minor allele frequency (MAE) of 0.24, with highest MAF reported in patients with African/African American ancestry (0.40).

Figure 4:
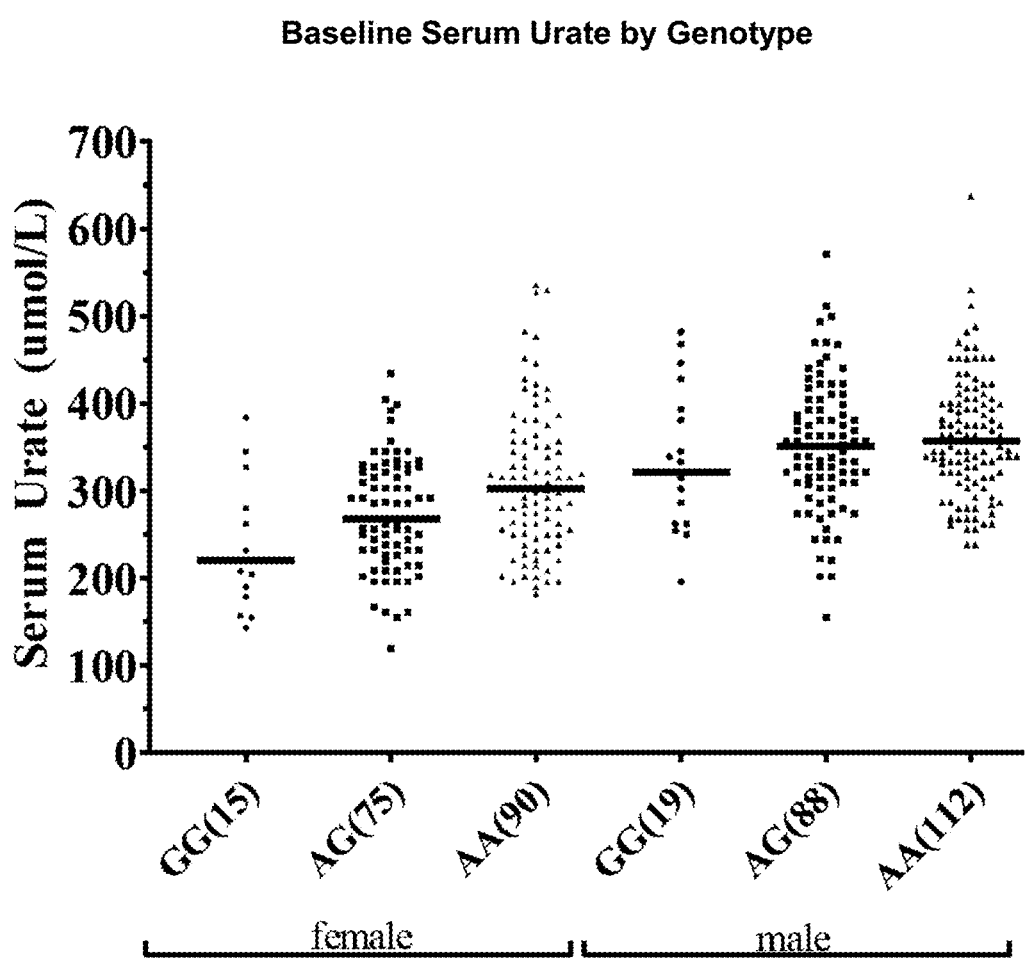
FIG. 4 plots baseline evaluations of serum urate according to patient genotype and sex in the study described in Example 1.

FIG. 4 illustrates baseline evaluations of serum urate according to patient genotype and sex. Data points in the 3 left-most columns represent female patients (GG(15), AG(75), and AA(90)), while data points in the 3 right-most columns represent male patients (GG(19), AG(88), and AA(112)). Bars for each column represent the mean level of serum urate. In both males and females, individuals having a genotype of rs7442295(A/A) have higher mean baseline serum urate concentrations than individuals of the same sex having A/G or G/G genotypes. Again in both sexes, individuals having a genotype of rs7442295(G/G) have lower mean baseline serum urate concentrations than individuals of the same sex having A/G or AA genotypes. The minor allele (G) effect at baseline is more pronounced in females, as seen in the larger difference between serum urate levels in GG vs. AA females, as compared to the smaller difference between serum urate levels in GG vs. AA males. In general, male patients have higher mean serum urate concentrations at baseline than female patients.

Figure 5:
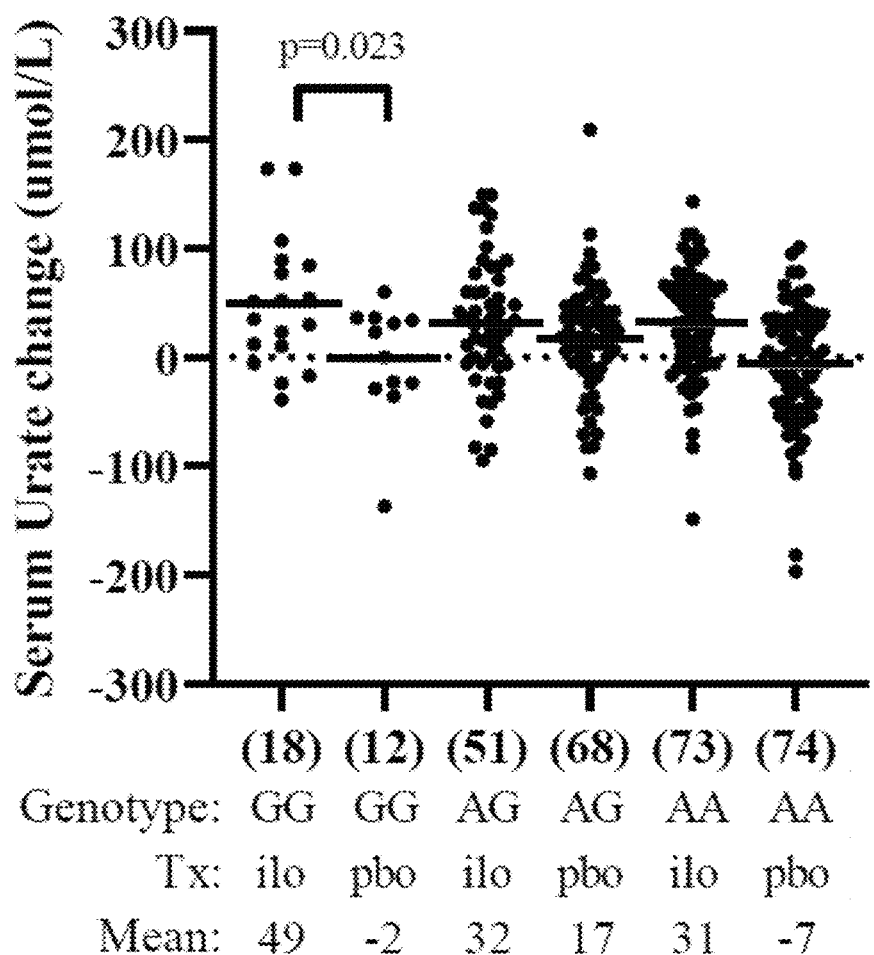
FIG. 5 plots individual patient changes from baseline to Day 28 in the study described in Example 1, grouped according to treatment group and carrier status for variant rs7442295, in which the red line represents mean.
Figure 6:
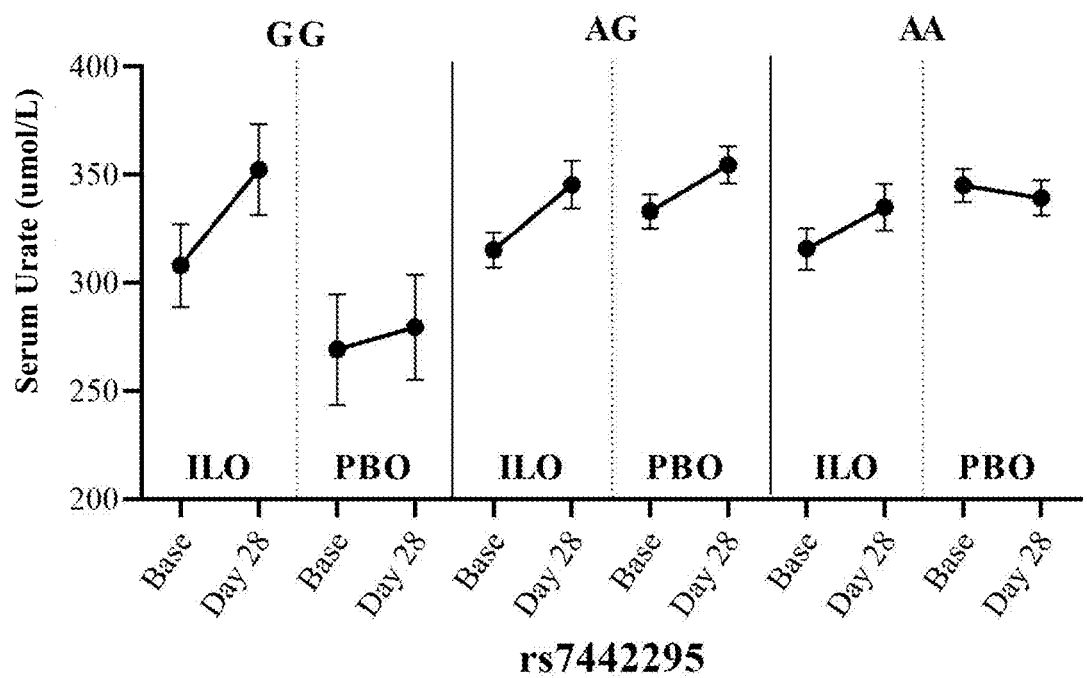
FIG. 6 plots the mean concentrations of serum urate at baseline and Day 28 by genotype and treatment for observed cases in the study described in Example 1, in which error bars represent the standard error of the mean.

As shown in FIGS. 5-6, the rs7442295 variant of interest has a statistically significant effect on iloperidone-induced change in serum urate levels from baseline to Day 28 in carrier status for rs7442295. The significant interaction affecting change is particularly observed between genotype*sex*treatment (full model: Multiple R-squared: 0.09251, Adjusted R-squared: 0.07078, F-statistic: 4.256 on 8 and 334 DF, p=0.00006942).

This observation is statistically significant when comparing genotypes at EOS as well as when comparing GG with AG and AA genotypes between treatment and placebo group in both males and females combined. Table 3 (below) provides mean change from baseline to Day 28 by treatment group and carrier status for variant rs7442295, and Table 4 (below) provides LS mean change in serum urate from baseline to Day 28 evaluations for serum urate by treatment group and carrier status for variant rs7442295) (SD=standard deviation).

TABLE 3

Mean Change from Baseline to Day 28 in Serum Urate for Observed Cases by Genotype and Treatment Study 3201 (Bipolar Mania)

| Visit | Genotype | Iloperidone Mean Change (SE), n | Placebo Mean Change (SE), n |
|---|---|---|---|
| Day 28 | AA | 30.5 (50.99), 73 | −6.8 (56.44), 74 |
| Day 28 | AG | 31.9 (59.39), 51 | 17.4 (50.61), 68 |
| Day 28 | GG | 49.1 (60.56), 18 | −2.4 (52.90), 12 |

TABLE 4

LS Mean Change in Serum Urate by Genotype and Treatment Study 3201 (Bipolar Mania)

Figure 7:
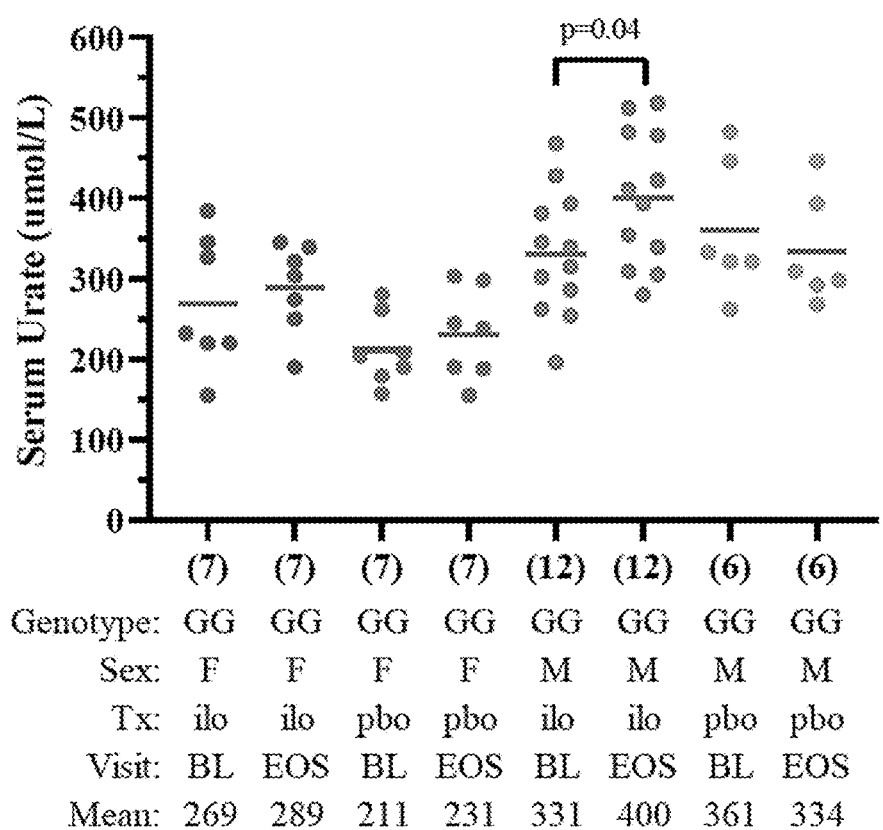
FIG. 7 plots the change from baseline in serum urate by sex in the study described in Example 1.

| Visit | Genotype | Iloperidone LS Mean Change (SE), n | Placebo LS Mean Change (SE), n | LS Mean Difference (95% CI) | p-value |
|---|---|---|---|---|---|
| Day 28 | AA | 25.74 (6.53), 73 | −6.17 (6.47), 74 | 31.91 (14.82, 49) | 0.0003 |
| Day 28 | AG | 24.62 (7.61), 51 | 9.78 (6.67), 68 | 14.84 (−4.18, 33.86) | 0.1256 |
| Day 28 | GG | 40.09 (12.36), 18 | −16.86 (15.37), 12 | 56.95 (18.91, 94.99) | 0.0035 |
| EOS | AA | 16.73 (5.66), 101 | −1.5 (5.67), 100 | 18.23 (3.19, 33.28) | 0.0176 |
| EOS | AG | 15.05 (6.29), 80 | 6.45 (6.21), 82 | 8.61 (−8.27, 25.48) | 0.3166 |
| EOS | GG | 40.4 (12.41), 19 | −15 (14.26), 15 | 55.4 (18.68, 92.13) | 0.0032 | patients with bipolar disorder. FIG. 5 illustrates individual patient changes in serum urate (in µmol/L) from baseline to Day 28, grouped according to treatment group (iloperidone or placebo) and carrier status for variant rs7442295, while FIG. 6 illustrates mean serum levels for at patient evaluations conducted at baseline and Day 28, separated according to treatment group (iloperidone or placebo) and patient These data show that iloperidone-associated increase in serum urate is significant in individuals who are homozygous for the rs7442295 (G) allele, i.e. have an rs7442295-G/G genotype at the SLC2A9 gene. Changes from baseline to study endpoint in serum urate in association with rs7442295-G/G genotype are particularly pronounced in males, as shown in Table 5 and FIG. 7.

TABLE 5

LS Mean Change in Serum Urate by Genotype, Sex, and Treatment in Study 3201 (Bipolar Mania)

| Visit | Genotype | Sex | Iloperidone LS Mean Change (SE), n | Placebo LS Mean Change (SE), n | LS Mean Difference (95% CI) | p-value |
|---|---|---|---|---|---|---|
| Day 28 | AA | F | 25.48 (9.16), 34 | −2.37 (9.06), 34 | 27.85 (2.93, 52.76) | 0.0286 |
| Day 28 | AA | M | 28.89 (8.7), 39 | −6.62 (8.58), 40 | 35.52 (12.82, 58.22) | 0.0023 |
| Day 28 | AG | F | 0.06 (10.14), 27 | 7.96 (9.87), 29 | −7.9 (−34.82, 19.03) | 0.5641 |
| Day 28 | AG | M | 53.41 (10.84), 24 | 12.62 (8.7), 39 | 40.79 (14.61, 66.96) | 0.0024 |
| Day 28 | GG | F | −0.19 (19.49), 7 | −3.27 (20.1), 7 | 3.08 (−50.97, 57.13) | 0.9107 |
| Day 28 | GG | M | 65.61 (15.42), 11 | −37.35 (23.02), 5 | 102.96 (48.93, 156.99) | 0.0002 |
| EOS | AA | F | 14.93 (8.59), 41 | −1.04 (7.81), 48 | 15.97 (−6.71, 38.64) | 0.1669 |
| EOS | AA | M | 20.63 (7.29), 60 | 1.64 (7.87), 52 | 18.99 (−0.89, 38.86) | 0.0611 |
| EOS | AG | F | −2.27 (8.75), 39 | −0.87 (9.26), 36 | −1.4 (−25.85, 23.06) | 0.9106 |

TABLE 5-continued

LS Mean Change in Serum Urate by Genotype, Sex,
and Treatment in Study 3201 (Bipolar Mania)

| Visit | Geno-type | Sex | Iloperidone LS Mean Change (SE), n | Placebo LS Mean Change (SE), n | LS Mean Difference (95% CI) | p-value |
|---|---|---|---|---|---|---|
| EOS | AG | M | 32.96 (8.74), 41 | 13.38 (8.26), 46 | 19.58 (−2.91, 42.08) | 0.0878 |
| EOS | GG | F | −6.03 (20.3), 7 | −10.58 (19.66), 8 | 4.54 (−50.43, 59.52) | 0.8709 |
| EOS | GG | M | 67.03 (15.38), 12 | −21.43 (20.27), 7 | 88.45 (38.7, 138.21) | 0.0005 |

Results of ANCOVA model of change from baseline to either day 28 evaluation or end of study evaluation (last observation carried forward).

Figure 8A:
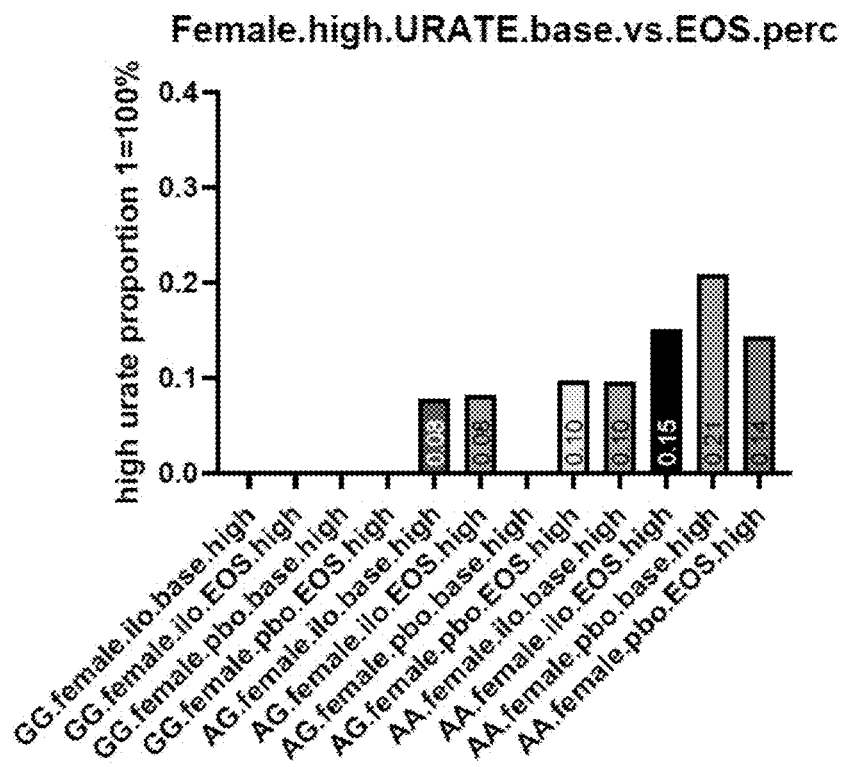
FIGS. 8A (females) and 8B (males) illustrate the percentage of individuals, stratified by sex, and their shifts in serum urate concentration. These figures illustrate the clinical relevance of the rs7442295-G/G genotype, in which a significant number of individuals (particularly homozygous G/G males) exceed the upper limit of normal (ULN) when treated with iloperidone as compared to placebo.
Figure 8B:
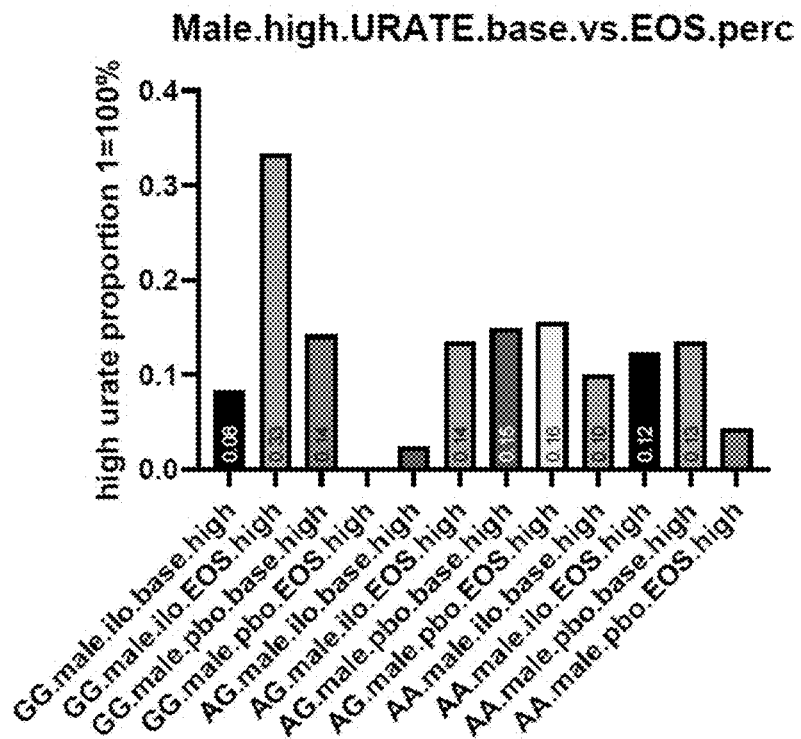

Lab specified ranges for upper level of normal (ULN) values for serum urate measurements are 453 μmol/l for adult male patients and 394 μmol/l for adult female patients. The iloperidone-associated increase in serum urate results in a serum urate concentration that is above ULN value in individuals that are homozygous (GG) for the rs7442295 (G) allele at the SLC2A9 gene, especially in males. As shown in Table 6 (below) and FIGS. 8A-8B, the percentage of male individuals (FIG. 8B) with rs7442295-G/G genotypes and with high urate levels increases by approximately 4-fold upon treatment with iloperidone, from about 8.3% at baseline to about 33.3% at end of study.

TABLE 6

Study 3201: Proportion of Patients with Serum Urate
Concentrations Above the Upper Limit of Normal (ULN)
by Sex and SLC2A9 Variant rs7442295 Genotype Subgroups

| | rs7442295 genotype | Male | | Female | |
|---|---|---|---|---|---|
| | | Iloperidone | Placebo | Iloperidone | Placebo |
| Baseline, percentage of patients above ULN | GG | 8.3% (1/12) | 14.3% (1/7) | 0.0% (0/7) | 0.0% (0/8) |
| | AG | 2.4% (1/41) | 14.9% (7/47) | 7.7% (3/39) | 0.0% (0/36) |
| | AA | 10.0% (6/60) | 13.5% (7/52) | 9.5% (4/42) | 20.1% (10/48) |
| EOS, percentage of patients above ULN | GG | 33.3% (4/12) | 0.0% (0/6) | 0.0% (0/7) | 0.0% (0/70 |
| | AG | 13.5% (5/37) | 15.5% (7/45) | 8.1% (3/37) | 9.7% (3/31) |
| | AA | 12.3% (7/57) | 4.3% (2/46) | 15.0% (6/40) | 14.3% (6/42) |

These data show that iloperidone is associated with increases in serum urate compared to placebo. Increases in serum urate levels are nearly twice as large in iloperidone-treated patients homozygous for the common variant rs7442295 (G) in the SLC2A9 transporter gene (i.e., patients with the (GG) genotype).

Figure 9:
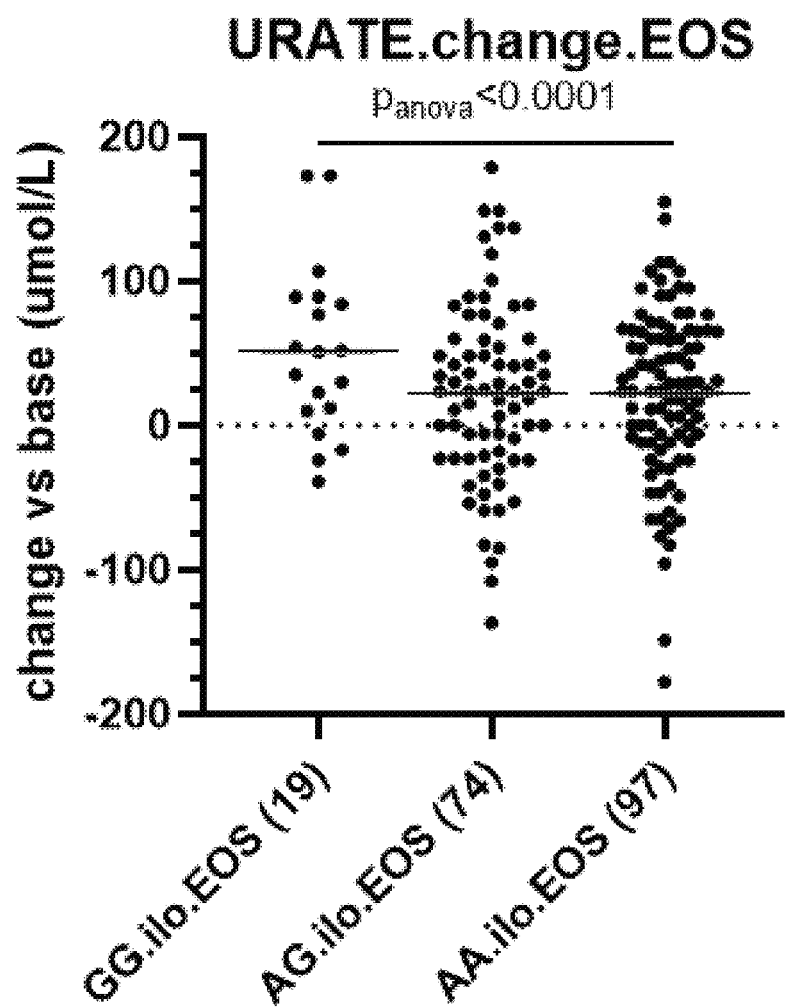
FIG. 9 plots the amount of change from baseline to EOS in serum urate concentration (in umol/L) by genotype in iloperidone treatment groups in the study described in Example 1.

FIG. 9 illustrates the change in SUC relative to baseline at EOS in iloperidone-treated patients, by SLC2A9 rs7442295 genotype. Iloperidone-treated patients having a homozygous rs7442295-G/G genotype demonstrate significantly greater change from baseline than individuals having a heterozygous rs7442295-A/G or homozygous rs7442295-A/A genotype ($p_{anova} < 0.0001$).

Example 2

A study is performed to evaluate the efficacy and safety of iloperidone compared with placebo and active control (ziprasidone) in subjects with acute schizophrenia ("Study 3101"). Patients are randomized to receive one of iloperidone at a dose of 24 mg/day given in a divided dose as 12 mg twice daily (bid), active comparator ziprasidone, or placebo. At Day 28 evaluations, laboratory chemistry analysis shows that patients in the iloperidone treatment arm of the study demonstrate a roughly 4-fold greater increase from baseline in blood levels of uric acid compared to placebo groups, and more than twice the change from baseline observed in the ziprasidone arm. Uric acid results are converted to SI units using the conversion 1 mg/dL=59.5 μmol/L.

Patient data is analyzed using an ANCOVA model, and reveals a statistically significant increase in serum urate for iloperidone compared to placebo groups in patients with acute schizophrenia. The LS mean change from baseline to endpoint shows similar relationships to those described above in Example 1 (see Table 2). Results are provided in Table 7 below, including an increase of 28.0 μmol/L for iloperidone compared to a decrease of 4.2 μmol/L in placebo groups. The ziprasidone treatment arm shows an increase of 13.1 μmol/L, approximately half of that seen in with iloperidone treatment.

TABLE 7

Study 3101 (Schizophrenia) ANCOVA Results

| Visit | Iloperidone LS Mean Change (SE), n | LS Mean Change (SE), Placebo n | LS Mean Difference (95% CI) | p-value |
|---|---|---|---|---|
| Day 0 | 318.3 (73.19), 300 | 313.6 (79.73), 174 | — | — |
| Day 14 | 15.5 (58.85), 276 | −29.8 (4.94), 135 | 18.4 (6.55, 29.93) | 0.0024 |
| Day 28 | 28.0 (4.05), 206 | 4.2 (6.07), 98 | 23.8 (9.16, 37.96) | 0.0014 |

ANCOVA = Analysis of Covariance.
CI = Confidence Interval.
LS = Least Squares.
LS means, CIs, and p-values are based on ANCOVA model with main effects of treatment group and pooled site, and baseline as a covariate. All p values represent the difference between iloperidone and placebo.

Patient genotypes are obtained via a commercial 500 k SNP Gene Chip Human Mapping Array. To test the hypothesis of altered urate serum levels in association with variants in SLC2A9, Linear models for SLC2A9 variants are performed on urate at baseline levels (corrected for PCs, age, sex) followed by samples collected at end of study (EOS).

Figure 10:
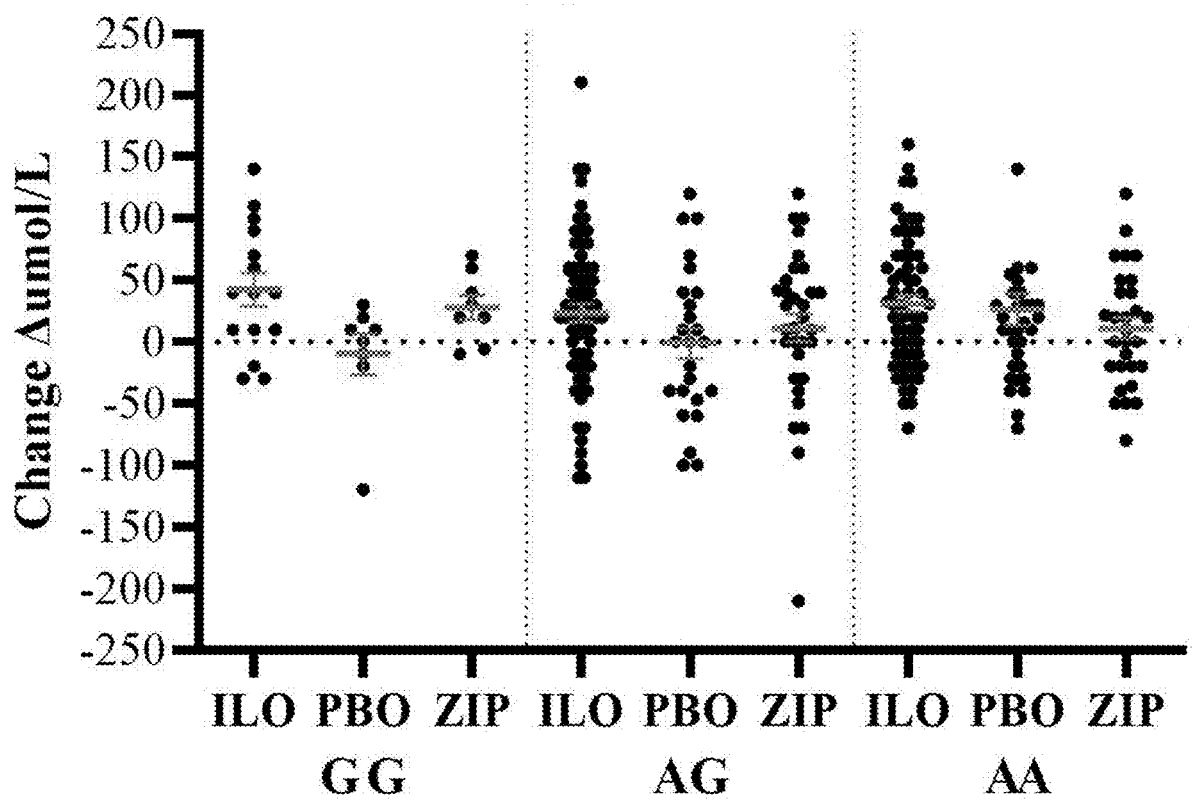
FIG. 10 plots change from baseline to EOS in serum urate by treatment group and carrier status for rs7442295 in the study described in Example 2, in which red line represents mean, and red error bars represent standard error of the mean (SEM).
Figure 11:
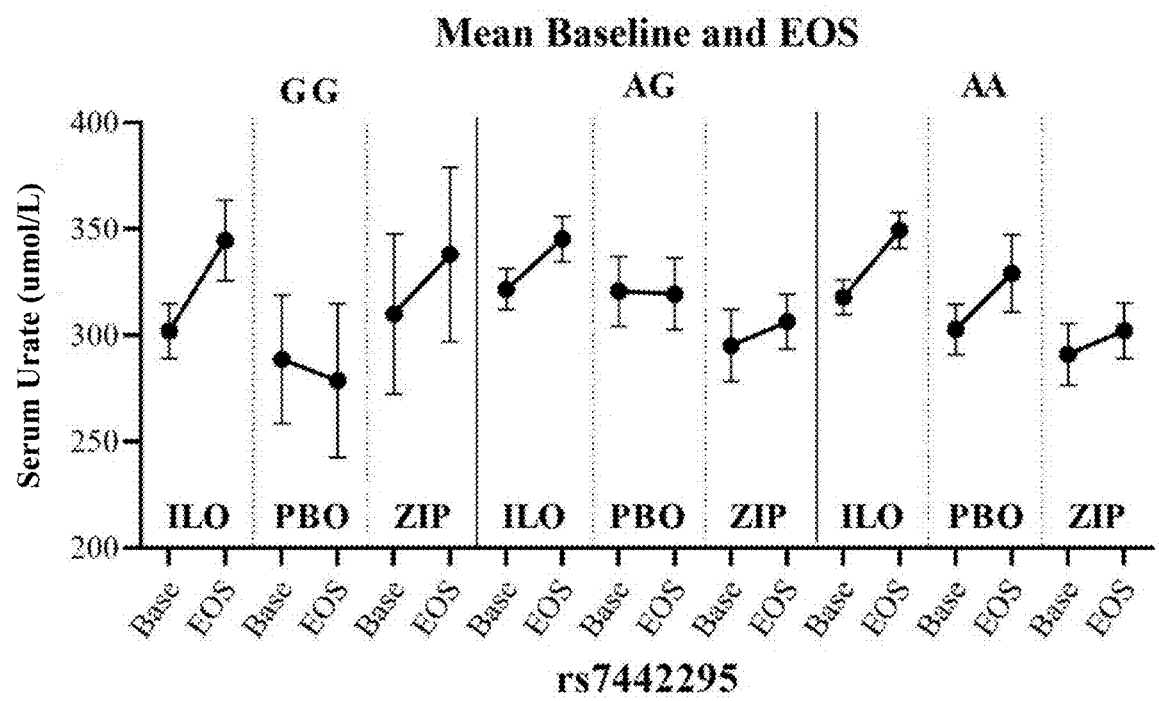
FIG. 11 plots mean serum urate at baseline and EOS by carrier status of variant rs7442295 in the study described in Example 2, in which error bars represent standard error of the mean.

As in Example 1 described herein, the variant of interest, rs7442295(G) has a statistically significant effect on iloperidone-induced change in serum urate levels from baseline in patients with schizophrenia, as measured at EOS. FIG. 10 illustrates the change from baseline to end of study evaluation for serum urate by treatment group and carrier status for variant rs7442295 in patients with schizophrenia. Individual patient values at baseline and study endpoint are shown for each of the three genotypes (GG, AG, AA) according to treatment arm. FIG. 11 illustrates mean (SEM)

serum urate levels at baseline and end of study (EOS) by carrier status of variant rs7442295 in patients with schizophrenia. Results are provided in tabular form in Tables 8-9.

TABLE 8

Mean Change from Baseline to Day 28 in Serum Urate for Observed Cases by Genotype and Treatment in Study 3101 (Schizophrenia)

| Visit | Genotype | Iloperidone Mean Change (SD), n | Placebo Mean Change (SD), n |
|---|---|---|---|
| Day 28 | AA | 30.5 (54.36), 62 | 26.8 (71.66), 35 |
| Day 28 | AG | 23.3 (61.91), 73 | −1.0 (59.28), 27 |
| Day 28 | GG | 42.7 (52.30), 15 | −10.0 (47.21), 8 |

The observed and derived mean difference is most pronounced in the GG phenotype. This effect is statistically significant according to ANCOVA model analysis (see Table 9).

TABLE 9

LS Mean Change in Serum Urate by Genotype and Treatment Study 3101 (Schizophrenia)

| Visit | Genotype | Iloperidone LS Mean Change (SE), n | Placebo LS Mean Change (SE), n | LS Mean Difference (95% CI) | p-value |
|---|---|---|---|---|---|
| Day 28 | AA | 35.5 (7.81), 62 | 24.9 (10.41), 35 | 10.05 (14.90, 35.97) | 0.41 |
| Day 28 | AG | 24.7 (7.27), 73 | −5.5 (12.00), 27 | 30.02 (−2.86, 57.63) | 0.03 |
| Day 28 | GG | 35.9 (15.76), 15 | −16.5 (21.53), 8 | 52.4 (0.33, 104.45) | 0.04 |

Figure 12:
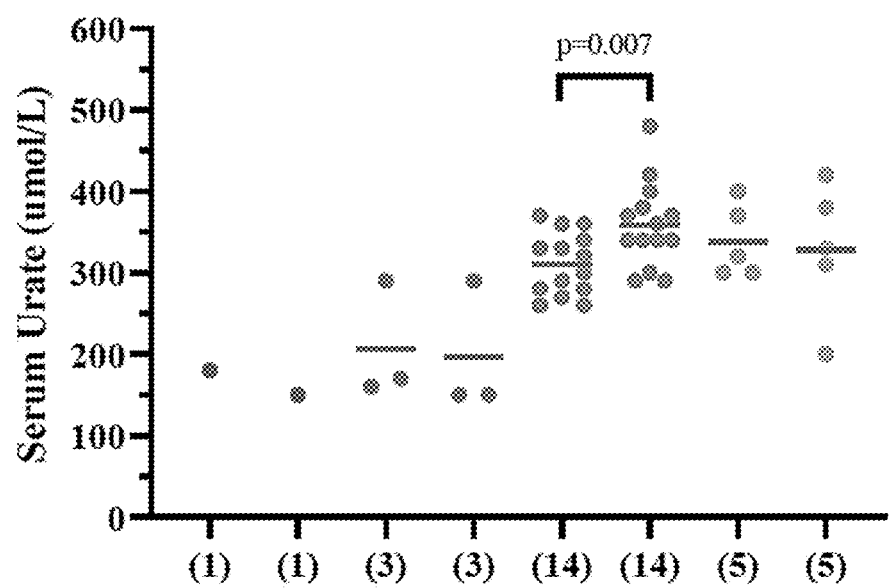
FIG. 12 plots change from baseline in serum urate by sex in the study described in Example 2.

Iloperidone-induced changes from baseline in serum urate in association with GG genotype are particular pronounced in male schizophrenia patients (see FIG. 12). These findings replicate the findings in bipolar disorder discussed above in Example 1.

Conclusions

The studies described in Examples 1 and 2 collectively show that iloperidone is associated with increases in serum urate compared to placebo in multiple clinical studies, including in patients with bipolar disorder and those with schizophrenia (see FIG. 3).

In interaction with iloperidone treatment, the homozygous rs7442295(G/G) genotype associates with greater iloperidone-induced change in serum urate concentration. Increases in serum urate levels are nearly twice as large in iloperidone-treated patients having a rs7442295(G/G) genotype in the SLC2A9 transporter gene. This effect is particularly pronounced in male patients.

The replication of these findings across multiple studies and patient populations supports the generalization of these findings to these and other patient populations, including to all individuals who are, will be, or may be treated with iloperidone.

As a result of the interactions described herein, it is recommended that iloperidone-treated patients with a personal or familial history of gout, and carriers of one or more rs7442295(G) alleles, are monitored for serum urate levels, as such individuals may need to increase the dose of their urate lowering treatments, or commence urate-lowering treatment to prevent or treat gout. The foregoing recommendations may also be applicable to iloperidone-treated patients who do not know whether they have a history of gout, who have no known history of gout, and/or otherwise without regard to gout history status.

Embodiments

Embodiments of the present disclosure may include the following features:

Item 1. In a method of treatment of a patient in need thereof with a compound that is iloperidone, a pharmaceutically acceptable salt of iloperidone, P88, or a pharmaceutically acceptable salt of P88, wherein the patient has a history of gout, the improvement comprising: monitoring a serum urate concentration (SUC) of the patient; and in an event that the SUC approaches or exceeds a reference level that is applicable to the patient, initiating treatment with, or increasing a dose of a urate lowering treatment.

Item 2. The improvement of item 1, wherein the patient has one or more rs7442295-G alleles at the SLC2A9 gene.

Item 3. The improvement of item 2, wherein the patient is homozygous for the rs7442295 (G) allele (rs7442295-G/G) at the SLC2A9 gene.

Item 4. The improvement of item 1, wherein the compound is iloperidone, and the treatment comprises administering the iloperidone at a dose of up to 24 mg/day.

Item 5. The improvement of item 1, wherein the reference level is 453 μmol/L if the patient is male, and 394 μmol/L if the patient is female.

Item 6. The improvement of item 1, wherein the monitoring comprises: obtaining a biological sample from the patient; and testing the biological sample to determine a concentration of urate in the biological sample.

Item 7. The improvement of item 6, wherein the monitoring further comprises performing the monitoring at one or more milestones selected from: on or about day 28 of treatment of the patient with iloperidone, on or about day 21 of treatment of the patient with iloperidone, on or about day 14 of treatment of the patient with iloperidone, on or about day 7 of treatment of the patient with iloperidone, and prior to treatment of the patient with iloperidone.

Item 8. In a method of treatment of a patient in need thereof with a compound, wherein the compound is iloperidone, a pharmaceutically acceptable salt of iloperidone, P88, or a pharmaceutically acceptable salt of P88, wherein the patient has a rs7442295 genotype at the SLC2A9 gene that includes one or more rs7442295 (G) alleles, the improvement comprising: monitoring a serum urate concentration (SUC) of the patient; and in an event that the SUC of the patient approaches or exceeds a reference level, initiating treatment with, or increasing a dose of a urate lowering treatment.

Item 9. The improvement of item 8, wherein the compound is iloperidone, and the treatment comprises administering the iloperidone at a dose of up to 24 mg/day.

Item 10. The improvement of item 8, wherein the reference level is 453 μmol/L if the patient is male, and 394 μmol/L if the patient is female.

Item 11. The improvement of item 8, wherein the patient is homozygous for the rs7442295 (G) allele (rs7442295-G/G) at the SLC2A9 gene.

Item 12. The improvement of item 8, wherein the initiating or increasing reduces a likelihood that the patient will suffer an attack of gout.

Item 13. The improvement of item 8, wherein the patient is deemed to approach the reference level when the patient has a SUC within about 10% of the reference level.

Item 14. The improvement of item 8, wherein the monitoring comprises: obtaining a biological sample from the patient; and testing the biological sample to determine a concentration of urate in the biological sample.

Item 15. The improvement of item 14, wherein the monitoring further comprises performing the monitoring at one or more milestones selected from: on or about day 28 of treatment of the patient with iloperidone, on or about day 21 of treatment of the patient with iloperidone, on or about day 14 of treatment of the patient with iloperidone, on or about day 7 of treatment of the patient with iloperidone, and prior to treatment of the patient with iloperidone.

Item 16. The improvement of item 8, wherein the patient has a history of gout.

Item 17. In a method of treatment of a patient in need thereof with a compound that is iloperidone, a pharmaceutically acceptable salt of iloperidone, P88, or a pharmaceutically acceptable salt of P88, the improvement comprising: monitoring a serum urate concentration (SUC) of the patient; and in an event that the SUC approaches or exceeds a reference level, initiating treatment with, or increasing a dose of a urate lowering treatment.

Item 18. The improvement of item 17, wherein the patient has one or more rs7442295-G alleles at the SLC2A9 gene.

Item 19. The improvement of item 17, wherein the patient is homozygous for the rs7442295 (G) allele (rs7442295-G/G) at the SLC2A9 gene.

Item 20. The improvement of item 17, wherein the monitoring comprises performing: obtaining a biological sample from the patient; and testing the biological sample to determine a concentration of urate in the biological sample, wherein the obtaining and the testing are performed at one or more milestones selected from: on or about day 28 of treatment of the patient with iloperidone, on or about day 21 of treatment of the patient with iloperidone, on or about day 14 of treatment of the patient with iloperidone, on or about day 7 of treatment of the patient with iloperidone, and prior to treatment of the patient with iloperidone.

Item 21. In a method consisting essentially of treating a patient with iloperidone or a metabolite thereof, the improvement comprising: accounting for an increase in a serum urate level of the patient during treatment with the iloperidone or the metabolite thereof.

Item 22. The improvement of item 21, wherein the treatment comprises treatment with a metabolite of iloperidone, and wherein the metabolite comprises milsaperidone.

Item 23. The improvement of item 21, wherein the treatment comprises treatment with iloperidone.

Item 24. The improvement of item 23, wherein the treatment comprises treatment with iloperidone at a dose of 24 mg/day given as 12 mg twice daily (bid).

Item 25. The improvement of item 21, wherein the treatment with the iloperidone or the metabolite thereof results in the increase in the serum urate level of the patient.

Item 26. The improvement of item 21, wherein the accounting comprises monitoring the serum urate level of the patient.

Item 27. The improvement of item 26, wherein the monitoring comprises: obtaining or having obtained a biological sample from the patient; and testing or having tested the biological sample to determine a concentration of urate in the biological sample.

Item 28. The improvement of item 26, wherein the monitoring comprises performing the monitoring at one or more milestones selected from: on or about day 28 of treatment, on or about day 21 of treatment, on or about day 14 of treatment, on or about day 7 of treatment, and prior to treatment of the patient with iloperidone or the metabolite thereof.

Item 29. The improvement of item 21, wherein the accounting comprises instructing the patient to ask a doctor or a pharmacist before commencing treatment with the iloperidone or the metabolite of iloperidone if the patient is taking a prescription drug for gout.

Item 30. The improvement of item 21, wherein the accounting comprises informing the patient of one or more symptoms of gout.

Item 31. The improvement of item 21, wherein the accounting comprises instructing the patient to reduce or avoid consumption of alcohol, sugar-sweetened beverages and foods, high fructose corn syrup, and purine-rich foods.

Item 32. The improvement of item 21, wherein the accounting comprises instructing the patient to reduce or avoid co-administration of the iloperidone or the metabolite thereof with any of a diuretic, low-dose aspirin, niacin, an immunosuppressant, or cyclosporine.

Item 33. The improvement of item 21, wherein the accounting comprises initiating treatment with, or increasing a dose of a urate-lowering medication.

Item 34. The improvement of item 21, wherein the accounting comprises instructing the patient to discuss the treatment with a rheumatologist or a primary care physician.

Item 35. The improvement of item 21, wherein the accounting comprises monitoring the patient, or instructing the patient to self-monitor for a presence of a symptom of gout, wherein the symptom of gout is selected from pain, swelling, discoloration or redness, tenderness to touch, and warmth at an affected joint.

Item 36. The improvement of item 35, wherein the affected joint is a joint of a hallux (big toe).

Item 37. The improvement of item 35, wherein onset of the symptom occurs at night.

Item 38. The improvement of item 21, wherein the accounting comprises assessing or having assessed whether the patient is afflicted with any one or more of: obesity; congestive heart failure; a metabolic syndrome; chronic kidney disease; hypertension (high blood pressure); psoriasis; cancer; or a genetic condition associated with increased urate.

Item 39. The improvement of item 21, wherein the accounting comprises instructing the patient to reduce or avoid physical trauma or risk thereof.

Item 40. The improvement of item 21, wherein the accounting comprises monitoring the patient for development of hypertension, chronic kidney disease, obesity, diabetes, nephrolithiasis, myocardial infarction, or congestive heart failure.

Item 41. The improvement of item 21, whereby the accounting has the effect of preventing, limiting a frequency of, or limiting a severity of a disease, a condition, or a symptom caused by hyperuricemia or gout.

Item 42. In a method consisting essentially of treating a patient with 24 mg/day of iloperidone given as 12 mg twice daily (bid), the improvement comprising: accounting for an increase in a serum urate level of the patient during the treatment.

Item 43. The improvement of item 42, wherein the treatment with the iloperidone or the metabolite thereof results in the increase in the serum urate level of the patient.

Item 44. The improvement of item 42, wherein the accounting comprises monitoring the serum urate level of the patient, wherein the monitoring comprises: obtaining or having obtained a biological sample from the patient; and testing or having tested the biological sample to determine a concentration of urate in the biological sample.

Item 45. The improvement of item 42, wherein the accounting comprises instructing the patient to reduce or avoid consumption of alcohol, sugar-sweetened beverages and foods, high fructose corn syrup, and purine-rich foods.

Item 46. The improvement of item 42, wherein the accounting comprises instructing the patient to avoid co-administration of the iloperidone or the metabolite thereof with any of a diuretic, low-dose aspirin, niacin, an immunosuppressant, or cyclosporine.

Item 47. The improvement of item 42, wherein the accounting comprises initiating treatment with, or increasing a dose of a urate-lowering medication.

Item 48. The improvement of item 42, wherein the accounting comprises monitoring the patient, or instructing the patient to self-monitor for a presence of a symptom of gout, wherein the symptom of gout is selected from pain, swelling, discoloration or redness, tenderness to touch, and warmth at an affected joint.

Item 49. The improvement of item 42, wherein the accounting comprises monitoring the patient for development of hypertension, chronic kidney disease, obesity, diabetes, nephrolithiasis, myocardial infarction, or congestive heart failure.

Item 50. The improvement of item 42, whereby the accounting has the effect of preventing, limiting a frequency of, or limiting a severity of a disease, a condition, or a symptom caused by hyperuricemia or gout.

Item 51. In a method consisting essentially of treating a patient with milsaperidone, the improvement comprising: accounting for an increase in a serum urate level of the patient during treatment with the milsaperidone.

Item 52. The improvement of item 51, wherein the treatment comprises treatment with milsaperidone at a dose of 24 mg/day given as 12 mg twice daily (bid).

Item 53. The improvement of item 51, wherein the treatment with milsaperidone results in the increase in the serum urate level of the patient, and wherein the accounting has the effect of preventing, limiting a frequency of, or limiting a severity of a disease, a condition, or a symptom caused by hyperuricemia or gout.

Item 54. The improvement of item 51, wherein the accounting comprises monitoring the serum urate level of the patient.

Item 55. The improvement of item 54, wherein the monitoring comprises: obtaining or having obtained a biological sample from the patient; and testing or having tested the biological sample to determine a concentration of urate in the biological sample.

Item 56. The improvement of item 54, wherein the monitoring comprises performing the monitoring at one or more milestones selected from: on or about day 28 of treatment, on or about day 21 of treatment, on or about day 14 of treatment, on or about day 7 of treatment, and prior to treatment of the patient with iloperidone or the metabolite thereof.

Item 57. The improvement of item 51, wherein the accounting comprises instructing the patient to ask a doctor or a pharmacist before commencing treatment with the milsaperidone if the patient is taking a prescription drug for gout.

Item 58. The improvement of item 51, wherein the accounting comprises informing the patient of one or more symptoms of gout, or asking whether the patient is experiencing joint pain.

Item 59. The improvement of item 51, wherein the accounting comprises instructing the patient to reduce or avoid consumption of alcohol, sugar-sweetened beverages and foods, high fructose corn syrup, or purine-rich foods.

Item 60. The improvement of item 51, wherein the accounting comprises instructing the patient to reduce or avoid co-administration of the milsaperidone with any of a diuretic, low-dose aspirin, niacin, an immunosuppressant, or cyclosporine.

Item 61. The improvement of item 51, wherein the accounting comprises initiating treatment with, or increasing a dose of a urate-lowering medication.

Item 62. The improvement of item 61, wherein the accounting comprises instructing the patient to discuss the treatment with a rheumatologist or a primary care physician.

Item 63. The improvement of item 61, wherein the accounting comprises monitoring the patient, or instructing the patient to self-monitor for a presence of a symptom of gout, wherein the symptom of gout is selected from pain, swelling, discoloration or redness, tenderness to touch, and warmth at an affected joint.

Item 64. The improvement of item 61, wherein the accounting comprises assessing or having assessed whether the patient is afflicted with any one or more of: obesity; congestive heart failure; a metabolic syndrome; chronic kidney disease; hypertension (high blood pressure); psoriasis; cancer; or a genetic condition associated with increased urate.

Item 65. The improvement of item 61, wherein the accounting comprises instructing the patient to reduce or avoid physical trauma or risk thereof.

Item 66. The improvement of item 61, wherein the accounting comprises monitoring the patient for development of hypertension, chronic kidney disease, obesity, diabetes, nephrolithiasis, myocardial infarction, or congestive heart failure.

Item 67. A method of reducing a possibility of an adverse consequence resulting from an increase in a serum urate level in a patient to whom a therapeutically effective amount of milsaperidone is being administered, comprising: accounting for the increase in the serum urate level of the patient during treatment with the milsaperidone.

Item 68. The method of item 67, wherein the treatment with milsaperidone results in the increase in the serum urate level of the patient, and wherein the accounting has the effect of preventing, limiting a frequency of, or limiting a severity of a disease, a condition, or a symptom caused by hyperuricemia or gout.

Item 69. The method of item 67, wherein the accounting comprises monitoring the serum urate level of the patient.

Item 70. The method of item 67, wherein the monitoring comprises: obtaining or having obtained a biological sample from the patient; and testing or having tested the biological sample to determine a concentration of urate in the biological sample.

Item 71. The method of item 67, wherein the monitoring comprises performing the monitoring at one or more milestones selected from: on or about day 28 of treatment, on or about day 21 of treatment, on or about day 14 of treatment, on or about day 7 of treatment, and prior to treatment of the patient with iloperidone or the metabolite thereof.

Item 72. The method of item 67, wherein the accounting comprises instructing the patient to ask a doctor or a pharmacist before commencing treatment with the milsaperidone if the patient is taking a prescription drug for gout.

Item 73. The method of item 67, wherein the accounting comprises informing the patient of one or more symptoms of gout, or asking whether the patient is experiencing joint pain.

Item 74. The method of item 67, wherein the accounting comprises instructing the patient to reduce or avoid consumption of alcohol, sugar-sweetened beverages and foods, high fructose corn syrup, or purine-rich foods.

Item 75. The method of item 67, wherein the accounting comprises instructing the patient to reduce or avoid co-administration of the milsaperidone with any of a diuretic, low-dose aspirin, niacin, an immunosuppressant, or cyclosporine.

Item 76. The method of item 67, wherein the accounting comprises initiating treatment with, or increasing a dose of a urate-lowering medication.

Item 77. The method of item 67, wherein the accounting comprises instructing the patient to discuss the treatment with a rheumatologist or a primary care physician.

Item 78. The method of item 67, wherein the accounting comprises monitoring the patient, or instructing the patient to self-monitor for a presence of a symptom of gout, wherein the symptom of gout is selected from pain, swelling, discoloration or redness, tenderness to touch, and warmth at an affected joint.

Item 79. The method of item 67, wherein the accounting comprises: assessing or having assessed whether the patient is afflicted with any one or more of: obesity, congestive heart failure, a metabolic syndrome, chronic kidney disease, hypertension (high blood pressure), psoriasis, cancer, or a genetic condition associated with increased urate; and monitoring the patient for development of hypertension, chronic kidney disease, obesity, diabetes, nephrolithiasis, myocardial infarction, or congestive heart failure.

Item 80. The method of item 67, wherein the accounting comprises instructing the patient to reduce or avoid physical trauma or risk thereof.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed, but that the invention will include all embodiments falling within the scope of the appended claims.

What is claimed is:

1. A method of reducing a possibility of an adverse consequence resulting from an increase in a serum urate level in a patient in need of treatment with milsaperidone, and to whom a therapeutically effective amount of milsaperidone is being administered, comprising:
    accounting for the increase in the serum urate level of the patient during treatment with the milsaperidone, wherein the accounting comprises monitoring the serum urate level of the patient.

2. The method of claim 1, wherein the treatment with milsaperidone results in the increase in the serum urate level of the patient, and
    wherein the accounting has the effect of preventing, limiting a frequency of, or limiting a severity of a disease, a condition, or a symptom caused by hyperuricemia or gout.

3. The method of claim 1, wherein the monitoring comprises:
    obtaining or having obtained a biological sample from the patient; and
    testing or having tested the biological sample to determine a concentration of urate in the biological sample.

4. The method of claim 1, wherein the monitoring comprises performing the monitoring at one or more milestones selected from:
    on or about day 28 of treatment,
    on or about day 21 of treatment,
    on or about day 14 of treatment,
    on or about day 7 of treatment, and
    prior to treatment of the patient with the milsaperidone.

5. The method of claim 1, wherein the accounting further comprises instructing the patient to ask a doctor or a pharmacist before commencing treatment with the milsaperidone if the patient is taking a prescription drug for gout.

6. The method of claim 1, wherein the accounting further comprises informing the patient of one or more symptoms of gout, or asking whether the patient is experiencing joint pain.

7. The method of claim 1, wherein the accounting further comprises instructing the patient to reduce or avoid consumption of alcohol, sugar-sweetened beverages and foods, high fructose corn syrup, or purine-rich foods.

8. The method of claim 1, wherein the accounting further comprises instructing the patient to reduce or avoid co-administration of the milsaperidone with any of a diuretic, low-dose aspirin, niacin, an immunosuppressant, or cyclosporine.

9. The method of claim 1, wherein the accounting further comprises initiating treatment with, or increasing a dose of a urate-lowering medication in an event in which the serum urate level of the patient exceeds about 6 mg/dl.

10. The method of claim 1, wherein the accounting further comprises instructing the patient to discuss the treatment with a rheumatologist or a primary care physician.

11. The method of claim 1, wherein the accounting further comprises monitoring the patient, or instructing the patient to self-monitor for a presence of a symptom of gout,
    wherein the symptom of gout is selected from pain, swelling, discoloration or redness, tenderness to touch, and warmth at an affected joint.

12. The method of claim 1, wherein the accounting further comprises:
    assessing or having assessed whether the patient is afflicted with any one or more of: obesity, congestive heart failure, a metabolic syndrome, chronic kidney disease, hypertension (high blood pressure), psoriasis, cancer, or a genetic condition associated with increased urate; and
    monitoring the patient for development of hypertension, chronic kidney disease, obesity, diabetes, nephrolithiasis, myocardial infarction, or congestive heart failure.

13. The method of claim 1, wherein the accounting further comprises instructing the patient to reduce or avoid physical trauma or risk thereof.

14. The method of claim 1, wherein the patient in need of treatment with milsaperidone suffers from a disease or disorder selected from schizophrenia, a schizophreniform disorder, bipolar I disorder, acute manic and mixed episodes associated with bipolar I disorder, agitation associated with Alzheimer's Disease, agitation associated with dementia, agitation associated with autism, Parkinson's Disease Psychosis, or another psychotic disease or disorder.

* * * * *